(12) United States Patent
Iwaida et al.

(10) Patent No.: US 6,831,826 B2
(45) Date of Patent: Dec. 14, 2004

(54) POLARIZED ELECTRODE FOR ELECTRIC DOUBLE-LAYER CONDENSER, AND ELECTRIC DOUBLE-LAYER CONDENSER MANUFACTURED USING THE SAME, AND PROCESS FOR MANUFACTURING ELECTRODE SHEET FOR ELECTRIC DOUBLE-LAYER CONDENSER, AND LAMINATING APPARATUS

(75) Inventors: Manabu Iwaida, Saitama (JP); Shigeki Oyama, Saitama (JP); Kenichi Murakami, Saitama (JP); Kouki Ozaki, Aichi (JP); Masanori Tsutsui, Aichi (JP)

(73) Assignees: Honda Motor Co., Ltd., Tokyo (JP); Daido Metal Co., Ltd., Nagoya (JP)

(*) Notice: Subject to any disclaimer, the term of this patent is extended or adjusted under 35 U.S.C. 154(b) by 0 days.

(21) Appl. No.: 10/721,781

(22) Filed: Nov. 26, 2003

(65) Prior Publication Data

US 2004/0165337 A1 Aug. 26, 2004

(30) Foreign Application Priority Data

| Nov. 29, 2002 | (JP) | ................................. P.2002-347941 |
| Nov. 29, 2002 | (JP) | ................................. P.2002-349226 |
| Nov. 29, 2002 | (JP) | ................................. P.2002-349260 |

(51) Int. Cl.$^7$ ................................................ H01G 9/00
(52) U.S. Cl. ...................... 361/502; 361/508; 361/512; 29/25.03
(58) Field of Search ................................. 361/502, 508, 361/509, 512, 516, 511; 29/25.03

(56) References Cited

U.S. PATENT DOCUMENTS

| 6,134,760 A | * 10/2000 | Mushiake et al. ......... 29/25.03 |
| 6,414,838 B1 | * 7/2002 | Oyama et al. .............. 361/511 |
| 2004/0165337 A1 | * 8/2004 | Iwaida et al. ............... 361/502 |

FOREIGN PATENT DOCUMENTS

| JP | 7-105316 | 11/1995 |
| JP | 11-154630 | 6/1999 |
| JP | 2001-267187 | 9/2001 |

* cited by examiner

Primary Examiner—Anthony Dinkins
(74) Attorney, Agent, or Firm—Arent Fox PLLC

(57) ABSTRACT

A polarized electrode for an electric double-layer condenser, which has a structure for preventing the damage of the end portion of the electrolyte belonging to the collecting foil, in the process for manufacturing the electric double-layer condenser, and an electric double-layer condenser using the polarized electrode.

15 Claims, 16 Drawing Sheets

POLARIZED ELECTRODE FOR ELECTRIC DOUBLE-LAYER CONDENSER, AND ELECTRIC DOUBLE-LAYER CONDENSER MANUFACTURED USING THE SAME, AND PROCESS FOR MANUFACTURING ELECTRODE SHEET FOR ELECTRIC DOUBLE-LAYER CONDENSER, AND LAMINATING APPARATUS

BACKGROUND OF THE INVENTION

The present invention relates to a polarized electrode for an electric double-layer condenser and an electric double-layer condenser manufactured by using the polarized electrode and, more particularly, to a polarized electrode for an electric double-layer condenser, which can suppress the damage or separation of an electrode contained in the polarized electrode.

Further, the present invention relates to a polarized electrode for an electric double-layer condenser, a process for manufacturing the same, and an electric double-layer condenser manufacturing by using the polarized electrode and, more particularly, to a polarized electrode for an electric double-layer condenser, in which two end portions of the electrode are protected.

Still further, the present invention relates to a process for manufacturing an electrode sheet for an electric double-layer condenser, in which sheet-shaped electrodes are adhered to the surfaces of a conductive foil through an conductive adhesive, and a laminating apparatus suitable for executing the manufacturing process.

The electric double-layer condenser is also called as the "electric double-layer capacitor" and is provided with a polarized electrode and an electrolyte for storing electric charges by using the electric double-layer formed in the boundary between the polarized electrode and the electrolyte. Therefore, the electric double-layer condenser has a high farad-level capacity and is excellent in the charging/discharging cycle characteristics for quick-charging operations so that it is applied in recent years to various fields for a backup power source of an electronic device or a car-mounted battery.

The electric double-layer condenser of the prior art will be described with reference to FIG. 5. FIG. 5 is a sectional diagram schematically showing a construction of an electric double-layer condenser 101 of one example of the prior art. This electric double-layer condenser 101 is constructed such that a pair of polarized electrodes having collecting foils 104 and 104 adhered to carbon electrodes 105 and 105 are arranged in a container 102 through a separator 103, and such that the container 102 is filled with an ion-conductive electrolyte.

When a voltage is applied to the electric double-layer condenser 101 of the prior art thus constructed, electric double layers, in which charges (as indicated by symbols + and −) are densely present at a distance as short as the molecular level, are formed at the interface between the solid polarized electrode (having the carbon electrodes 105 adhered to the collecting foils 104) and the liquid electrolyte, so that the charges are stored in that electric double layers.

Here, the electrolyte to be used in that electric double-layer condenser 101 is coarsely divided into the "aqueous electrolyte" prepared by adding an electrolyte to a dilute sulfuric acid and the "organic solvent group electrolyte" prepared by adding an electrolyte to an organic solvent, which are properly used for the purpose. Specifically, the electric double-layer condenser using the aqueous electrolyte is relatively low in the internal resistance so that it is advantageous in the power density and relatively higher in the degree of freedom for setting the output voltage. On the other hand, the electric double-layer condenser using the organic solvent group electrolyte can have a relatively high electric strength per unit cell so that it is advantageous in the energy density and can use a relatively inexpensive and light metal foil of aluminum or the like.

(Polarized Electrode)

FIG. 3A and FIG. 3B are diagrams schematically showing practical examples of such electric double-layer condenser. FIG. 3A is an exploded perspective view of a laminated type electric double-layer condenser, and FIG. 3B is a sectional view of a coin type electric double-layer condenser. Specifically, the laminated type electric double-layer condenser 1 is constructed such that a wound member 3, which is prepared by spirally winding polarized electrodes 9 and 10 having electrodes 12 and 15(e) adhered to collecting foils 11 and 14 through separators 17 and 18, is housed in a container 2, and such that the container 2 is filled with the aforementioned electrolyte.

On the other hand, a coin type electric double-layer condenser 1' shown in FIG. 3B is constructed such that a laminate, which is prepared by laminating polarized electrodes having electrodes 12' and 15' adhered to collecting foils 11' and 14' through a separator 17', is housed in a container 2', and such that the container 2' is filled with the aforementioned electrolyte. In FIG. 3B, reference numeral 21 designates a portion to be filled with the electrolyte, and reference numeral 22 designates a packing provided for preventing the leakage of the electrolyte to the outside. The winding type electric double-layer condenser shown in FIG. 3A and the coin type electric double-layer condenser 1' shown in FIG. 3B are suitable for a backup power source of an electronic device or a car-mounted battery.

In this electric double-layer condenser, the polarized electrodes have to be provided with a porous structure for satisfying various characteristics demanded in the fields of the backup power source of the electronic device or the car-mounted battery. The additional demands are the durability for suppressing the cracking or damage and the strength for holding the shape properly while supposing the continuous use in various modes and under various conditions for a long time, and the proper coordinations between the flexibility cost suited for the shaping works at the manufacturing time.

A polarized electrode for an electric double-layer condenser, as satisfying those demands, is constructed such that electrodes, which are prepared by dispersing an active substance including mainly active carbon and a conductive filler through a binder and by forming them into a sheet shape, are adhered through an adhesive layer.

However, the electric double-layer condenser having such polarized electrode has an inherent problem that the electrode material such as carbon contained in the electrode partially falls due to the aging to invite deteriorations in performance such as the drop in the output voltage or the rise in the internal resistance. If the electrode material thus having fallen is floating in the electrolyte or is mixed into the separator, moreover, the desired output voltage is difficult to be stably kept for a long time.

As the method for preventing the falling of electrode forming granules or one of the electrode materials of the electric double-layer condenser, therefore, there is disclosed a method (as referred to Patent Publication) for manufacturing a polarized electrode for an electric double-layer condenser, by forming an intimate mixture of a material of an electrode such as fine carbon powder (or active carbon), a conductive filler and a binder, and a liquid lubricant into a sheet shape, subsequently by removing the lubricant, sequentially by stretching the formed sheet uniaxially or multi-axially.

In order to solve the aforementioned problem, alternatively, there is disclosed an electric double-layer condenser (as referred to Patent Publication 2), in which the tensile strength of a polarized electrode is regulated to 0.13 MPa or higher so as to prevent the falling of the carbon including the aforementioned electrode into the electrolyte.

[Patent Publication 1]
    JP-B-7-105316
[Patent Publication 2]
    JP-A-2001-267187

However, the polarized electrode for the electric double-layer condenser of the prior art can eliminate the falling of the granules contained therein to some extent. On the other hand, there is left unsolved a problem that the end portion is more susceptible to damage than the remaining portion at the step of packing that polarized electrode. If the end portion of the collecting foil is damaged, more specifically, the end portion of the electrolyte adhered to the collecting foil is also so adversely affected that the self-discharge of the electric double-layer condenser increases or that the dispersion of the self-discharging percentage becomes large among the products of the electric double-layer condenser. However, this point is not especially considered in the aforementioned polarized electrode for the electric double-layer condenser of the prior art.

However, the polarized electrode for the electric double-layer condenser of the prior art can eliminate the falling of the granules contained therein to some extent. After this polarized electrode is manufactured, however, the electrode may be separated or may fall from the collecting foil at the step of packaging the polarized electrode. When the electrode thus separates or falls from the collecting foil, it is feared that the self-discharge of the electric double-layer condenser increases or that the dispersion of the self-discharging percentage becomes large among the products of the electric double-layer condenser.

Further, the electric double-layer condenser (or capacitor) has a high capacity and is excellent in the charging/discharging cycle characteristics so that it is investigated for applications to various devices such as various backup power sources for automobiles. As the electric double-layer condenser of a high capacity of this kind, there is a cylindrical type, which is constructed by winding a pair of positive and negative electrode sheets having carbon sheets (or polarized electrodes) including mainly active carbon and held on an aluminum foil (or a collecting electrode), in a coil shape through separators in between, and by housing the electrode sheets in a cylindrical case while being impregnated with an electrolyte.

In this case, the carbon sheets (or the sheet-shaped electrodes) and the aluminum foil (or the conductive foil) are adhered (or laminated) to each other with the conductive adhesive so that they may be integrated (as referred to Patent Publication 3). The reason for the use of the conductive adhesive is to reduce the contact resistance at the joint boundary between the sheet-shaped electrodes and the conductive foil. If the contact resistance between the sheet-shaped electrodes and the conductive foil is high, the internal resistance of the electric double-layer condenser is increased to invite a drop in the performance.

[Patent Publication 3]
    JP-A-11-154630

Here, a continuous and long electrode sheet is required for manufacturing the aforementioned cylindrical type electric double-layer condenser of the high capacity. It is also desired to reduce the contact resistance at the joint boundary between the sheet-shaped electrodes and the conductive foil constructing that electrode sheet and to attain the sufficient joint strength between them. If the conductive adhesive layer to joint the sheet-shaped electrodes and the conductive foil is thick at this time, the internal resistance becomes high, and the thickness is increased as a whole to lower the filling density of the capacitor container. If the thickness becomes heterogeneous, on the other hand, the adhesion is not stabilized to fail to attain a sufficient joint strength.

SUMMARY OF THE INVENTION

The present invention is conceived to solve the aforementioned problems and has an object to provide a polarized electrode for an electric double-layer condenser, which has a structure for preventing the damage of the end portion of the electrolyte belonging to the collecting foil, in the process for manufacturing the electric double-layer condenser, and an electric double-layer condenser using the polarized electrode.

In order to solve the aforementioned problems, we have clarified that the end portion of the electrode adhered to the collecting foil is hardly susceptible to the damage, if the end portion of the electrolyte is arranged in the process for manufacturing the electric double-layer condenser at the portion not to obstruct the voltage keeping of the electric double-layer condenser and at a portion spaced within a predetermined range from the end portion of the collecting foil, as might otherwise be susceptible to the damage. As a result, we have created the invention by finding that the separation of the end face of the electrode and the falling of the active substance from the electrode are reduced to suppress the self-discharging percentage of the electric double-layer condenser at a low value and to reduce the dispersion of the self-discharging percentage.

(1) In order to solve the aforementioned problems, according to the invention, there is provided a polarized electrode for a laminated type electric double-layer condenser, in which a band-shaped electrode member including an electrode: prepared by dispersing an active substance including mainly active carbon and a conductive filler through a binder and by forming them into a sheet shape; and adhered to at least one face of a collecting foil having a conductivity, and a separator having a shape corresponding to that of the electrode member are alternately laminated and spirally wound up. The end portion of the electrode is spaced, at the two axial end portions of the laminated type polarized electrode, at a distance of 0.1% or more of the width of the electrode member from the end portion of the electrode member.

With this construction, the end portion of the electrode is spaced, at the two axial end portions of the laminated type polarized electrode, at a distance of 0.1% or more of the width of the electrode member from the end portion of the electrode member. Therefore, the direct damage of the electrode can be prevented, even if a stress to act on the end portion of the polarized electrode occurs at the step of winding the band-shaped polarized electrodes spirally through the dielectric separator having a shape corresponding to the polarized electrodes into the wound member and at the step of packaging the wound member. As a result, the separation of the end face of the electrode member and the falling of the active substance from the electrode member can be reduced to provide the polarized electrode for the laminated type electric double-layer condenser excellent in the voltage keeping characteristics.

Here in the invention, the aforementioned "end-portion of the laminated type polarized electrode" and the aforementioned "end portion of the electrode member" imply the identical portions. Moreover, the aforementioned "width of the electrode member" is identical to the "width of the collecting foil".

(2) In the aforementioned polarized electrode for a laminated type electric double-layer condenser according to the invention, it is preferred that the end portion of the electrode is spaced, at the two axial end portions of the laminated type polarized electrode, at a distance of 0.1% to 10% of the width of the electrode member from the end portion of the electrode member.

With this construction, the capacity reduction of the electric double-layer condenser, as might otherwise be caused from the fact that the end portion of the electrode is spaced, at the two axial end portions of the laminated type polarized electrode, at the predetermined distance from that end portion, can be suppressed to a small value thereby to realize the polarized electrode for the electric double-layer condenser, with the aforementioned effects.

(3) In order to solve the aforementioned problems, according to the invention, there is provided a polarized electrode for a laminated type electric double-layer condenser, in which a band-shaped electrode member including an electrode: prepared by dispersing an active substance including mainly active carbon and a conductive filler through a binder and by forming them into a sheet shape; adhered to at least one face of a collecting foil having a conductivity; and cut to a desired size, and a separator having a shape corresponding to that of the electrode member are alternately laminated into a laminate. The end portion of the electrode is spaced, at the two axial end portions of the laminated type polarized electrode, at a distance of 0.1% or more of the width of the electrode member from the end portion of the electrode member.

With this construction, the end portion of the electrode is arranged, at the two axial end portions of the laminated type polarized electrode, at a distance of 0.1% or more of the width of the electrode member from the end portion of the electrode member. Therefore, the direct damage of the electrode can be prevented, even if a stress to act on the end portion of the polarized electrode occurs at the step of laminating the sheet-shaped polarized electrodes spirally through the dielectric separator having a shape corresponding to the polarized electrodes into the laminated member and at the step of packaging the laminated member. As a result, the separation of the end face of the electrode member and the falling of the active substance from the electrode member can be reduced to provide the polarized electrode for the laminated type electric double-layer condenser excellent in the voltage keeping characteristics.

(4) In the aforementioned polarized electrode for a laminated type electric double-layer condenser according to the invention, moreover, it is preferred that the end portion of the electrode is spaced at the two end portions of the laminated type polarized electrode, at a distance of 0.1% to 10% of the width of the electrode member from the end portion of the electrode member.

With this construction, there is embodied a polarized electrode, in which the capacity reduction of the electric double-layer condenser of the laminate, as might otherwise be caused from the fact that the end portion of the electrode is spaced, at the two end portions of the laminated type polarized electrode, at the predetermined distance from that end portion, can be suppressed to a smaller value.

Here in the invention, an electrode non-forming portion having no electrode is formed at the two end portions of the polarized electrode so that it may absorb and relax a stress, if any to act on the end portion of the polarized electrode. The stress on the polarized electrode portion can be eliminated to prevent the damage of the electrode more effectively.

If the aforementioned electrode non-forming portion is positioned between the end portion of a laminated type polarized electrode 1B or a laminated type polarized electrode 2B and the end portion of the electrode 1B or 2B which is arranged at a distance of 0.1% or more or preferably at a distance of 0.1% to 10% of the width of the electrode member from those end portions, the positioning can be suitably set according to the thickness, area or material of the collecting foil to be employed.

(5) Moreover, the invention provides an electric double-layer condenser comprising a polarized electrode for an electric double-layer condenser thus constructed.

With this construction, it is possible to realize the electric double-layer condenser, which is prevented from the problem that the manufacturing process is susceptible to the damage or separation of the polarized electrode, so that the yield can be improved to lower the cost and so that the desired performance can be exhibited stably for a long time.

The present invention is conceived to solve these problems and has an object to provide a polarized electrode for an electric double-layer condenser, which prevents the separation or falling of the electrode from the collecting foil, a process for manufacturing the polarized electrode, and an electric double-layer condenser manufactured by using that polarized electrode.

In view of the problems, we have made keen investigations and have found that the two end portions of the polarized electrode for the electric double-layer condenser and their peripheries have to be properly protected so as to prevent the separation or falling of the electrode from the collecting foil. Therefore, we have created the invention by finding the method, which can protect the two end portions of the electrode and their peripheries properly and easily when the electrode is to be adhered to the collecting foil.

(6) In order to solve the aforementioned problems, according to the invention, there is provided a polarized electrode for an electric double-layer condenser, in which an electrode prepared by dispersing an active substance including mainly active carbon and a conductive filler through a binder and by forming them into a sheet shape is adhered to at least one face of a collecting foil having a conductivity. The collecting foil has an etched portion subjected to an etching treatment, at the portion, to which the electrode is adhered, and in its vicinity. The etched portion is formed to have a width larger than that of the electrode and smaller than that of the adhesive layer. The adhesive layer has a width set larger by about 0.3 to 10% than that of the electrode member.

At this time, it is preferred that the central portion of the electrode is generally aligned with that of the adhesive layer.

With this construction, the adhesive layer formed on the collecting foil is wider than the electrode so that the two end portions of the electrode are coated with and protected by the adhesive layer when the collecting foil and the electrode are adhered through that adhesive layer.

(7) In the aforementioned polarized electrode for a laminated type electric double-layer condenser according to the invention, it is convenient that the adhesive layer is formed thicker at its two ends and their peripheries than at the remaining portions.

With this construction, the adhesive layer is formed thicker at its two ends and their peripheries than at the remaining portions. It is, therefore, possible to coat and protect the two end portions of the electrode and their peripheries sufficiently with the adhesive layer.

(8) In order to solve the aforementioned problems, according to the invention, there is provided a process for manufacturing an polarized electrode for an electric double-layer condenser according to the invention. The process comprises: the step of preparing an intimate mixture by kneading an active substance including mainly active carbon, a conductive filler and a binder; the step of preparing granules by pulverizing the intimate mixture; the step of preparing an electrode by shaping the granules; the step of applying an adhesive to the etched portion, to which the electrode is to be adhered, of the collecting foil; and the step of manufacturing a polarized electrode by adhering the electrode to at least one face of the collecting foil through the adhesive applied at the adhesive applying step. The two ends of the adhesive layer formed at the adhesive applying step and their peripheries are made thicker than the remaining portions.

Thus, the two end portions of the adhesive layer and their peripheries are made thicker than the remaining portions. When the electrode is to be adhered to the collecting foil through the adhesive layer, therefore, the adhesive layer can be spread from the clearance between the electrode and the collecting foil to the two end portions of the electrode thereby to coat and protect the two end portions of the electrode and their peripheries sufficiently.

(9) The invention can use a mesh roll at the adhesive applying step of the process for manufacturing the polarized electrode for the electric double-layer condenser. At this time, more adhesive can be applied to the two widthwise ends of the mesh roll and their peripheries by making the mesh size larger at the two widthwise end portions of the mesh roll and their peripheries.

Thus, the adhesive layer can be made thicker at the two widthwise end portions of the etched portion of the collecting foil and their peripheries than at the remaining portions by passing the collecting foil through the mesh roll.

(10) Moreover, the invention can use a gravure roll at the adhesive applying step in the process for manufacturing the polarized electrode for the electric double-layer condenser. At this time, the gravure roll is provided with grooves to be filled with the adhesive in the roll face to be contacted by the collecting foil, and the adhesive-filled grooves are so deeper at the two widthwise ends of the roll face and their peripheries than at the remaining portions as to apply more adhesive at the two end portions and their peripheries.

Thus, the adhesive layer can be made thicker at the two widthwise end portions of the etched portion of the collecting foil and their peripheries than at the remaining portions by passing the collecting foil through the mesh roll.

Here, the mesh size of the mesh roll thus constructed or the grooves formed in the roll face of the gravure roll are suitably adjusted to the portion where the electrode is adhered to the collecting foil. If the application area of the adhesive to the collecting foil is made properly larger than the area of the portion, to which the electrode is adhered, for example, the effect obtained by making the two widthwise end portions of the collecting foil and their peripheries thicker than the remaining portions can be more improved to protect the two end portions of the electrode and their peripheries more sufficiently and properly.

(11) In order to solve the aforementioned problems, according to the invention, there is provided an electric double-layer condenser manufactured by using the aforementioned polarized electrode for the electric double-layer condenser.

With this construction, the two end portions of the electrode contained in the polarized electrode and their peripheries can be protected, and the adhesive properties between the electrode and the collecting foil can be further enhanced. It is, therefore, possible to provide an electric double-layer condense, which can have a strength for maintaining its shape while suppressing the cracking or breakage, even if used continuously for a long time in various modes and under various conditions, and which can coordinate sufficiently the flexibility and cost demanded for the shaping works at the manufacturing time.

Here, the invention can be applied to both the laminated type electric double-layer condenser and the laminated type electric double-layer condenser.

Still further, the invention is conceived in view of the situations thus far described and has an object to provide a process for manufacturing an electrode sheet for an electric double-layer condenser, by adhering sheet-shaped electrodes and a conductive foil through a conductive adhesive to give a sufficiently low contact resistance while retaining a sufficient joint strength. Another object of the invention is to provide a laminating apparatus suitable for executing the manufacturing process.

In order to manufacture a long electrode sheet for the electric double-layer condenser, we have investigated not only the material faces but also various experiments and researches, on the laminating step of adhering the sheet-shaped electrodes and the conductive foil through the conductive adhesive, how to reduce the contact resistance at the joint portion between the sheet-shaped electrodes and the conductive foil and how to retain the joint strength. As a result, we have developed an optimum adhering (or laminating) process using the conductive adhesive and conceived the invention.

Specifically, the process for manufacturing the electrode sheet for the electric double-layer condenser according to the invention of Aspect 12, is characterized in that the laminating step of adhering the long sheet-shaped electrodes to the surfaces of the long conductive foil through the conductive adhesive is done by adhering the sheet-shaped electrodes while applying the conductive adhesive with a thickness of 10 microns or less (which is measured after applied and dried) to the surfaces of the conductive foil by using a gravure coater.

According to this process, the gravure coater is engraved with mesh-shaped recesses in the surface of the application roll so that the conductive adhesive held in the surface is transferred for the application to the surfaces of the conductive foil. In this case, the conductive adhesive can be applied with a homogeneous and sufficiently small thickness (at 10 microns or less, preferably 0.1 to 5 microns) to the surfaces of the conductive foil while being held at a predetermined amount per unit area on the surface of the application roll. Moreover, the conductive particles in the conductive adhesive are transferred to migrate into the recesses of the application roll so that they are homogeneously applied without any deviation to the surfaces of the conductive foil thereby to provide excellent electric characteristics.

In the sheet-shaped electrodes and the conductive foil adhered through the conductive adhesive, therefore, according to the invention of Aspect 12, the thickness of the adhesive layer can be made homogenous and sufficiently thin to provide the excellent effects to reduce the contact resistance between the sheet-shaped electrodes and the conductive foil sufficiently and to retain a sufficient joint strength.

At this time, an aluminum foil or the like can be adopted as the aforementioned conductive foil. It is preferred that the adhered portions of the surfaces of the conductive foil are made rough in advance by an etching treatment or the like. By the resultant so-called "anchoring effect", the joint strength can be more enhanced, and the conductive particles (e.g., fine particles of graphite or carbon black) in the conductive adhesive migrated into the rough pores so that the electric characteristics can be further enhanced (to lower the contact resistance).

As the carbon powder of the shaping materials to be used for manufacturing the aforementioned sheet-shaped electrodes, on the other hand, there is mainly used the active carbon, which could be replaced by carbon nano-tubes or carbon fibers. The conductive assistant is mainly exemplified by carbon black, which could be replaced by fine particles of a highly conductive metal. As the binder, there can be adopted fluorineres in powder such as polytetrafluoroethylene (as will be abbreviated into the "PTFE").

At the time of preparing the aforementioned shaping materials, it is desired to mix and blend them in a proper ratio, to pulverize their intimate mixture and to pulverize it to a proper granular distribution. After this, the material can be made suitable for the preliminary shaping treatment by adding a proper amount of binder assistant and mixing them. As the binder assistant at this time, there can be adopted alcohols such as isopropyl alcohol (as will be abbreviated into "IPA"), ethers or ketones.

In order to prepare the long sheet-shaped electrodes, the aforementioned shaping materials are subjected to a calendering treatment, for example, to form the sheet-shaped component. After this, rolling treatments are done several times to prepare the long sheet-shaped electrodes of a desired thickness (e.g., 160 microns). By executing the slitting step as the last stage of the rolling step, the rolled sheet-shaped electrodes can be cut off at their two end edge portions to a predetermined width.

Here in the invention, the conductive adhesive is continuously applied thinly to the conductive foil. This may cause partially cuts (or an application failures) of the conductive adhesive, but the adhesion to the sheet-shaped electrodes is continuously done. Therefore, the application failure position of the adhesive may be difficult to specify. In the invention of Aspect 13, therefore, at the laminating step, the surface state of the conductive foil having the conductive adhesive applied thereto is continuously monitored by an image pickup device. Even if the adhesive is partially cut, for example, the proper treatment can be accordingly done after the adhesion by storing that failure position.

In a laminating apparatus of the invention of Aspect 14, moreover, the long sheet-shaped electrodes are adhered through the conductive adhesive to the surfaces of the long conductive foil thereby to manufacture the electrode sheet for the electric double-layer condenser. This laminating apparatus is provided with the adhesive applying section for applying the conductive adhesive with a thickness of 10 microns or less to the surfaces of the conductive foil by using a gravure coater. According to this construction, as described above, the thickness of the adhesive layer can be made homogenous and sufficiently thin to reduce the contact resistance between the sheet-shaped electrodes and the conductive foil sufficiently and to retain a sufficient joint strength, so that the aforementioned manufacturing process is properly executed.

According to the invention of Aspect 15, the aforementioned laminating apparatus of Aspect 14 comprises monitor section for continuously monitoring the surface state of the conductive foil having the conductive adhesive applied thereto, by an image pickup device. Even if the adhesive is partially cut, for example, the proper treatment can be accordingly done after the adhesion by storing that failure position.

BRIEF DESCRIPTION OF THE DRAWINGS

FIGS. 1A is a sectional view, and FIG. 1B is a perspective view;

FIG. 2A is a sectional view, and FIG. 2B is a sectional view;

FIG. 3A is a perspective view of a laminated type electric double-layer condenser manufactured according to the first embodiment, and FIG. 3B is a sectional view of an electric double-layer condenser manufactured by using the polarized electrodes of the second embodiment;

FIG. 5A is a perspective view, and FIG. 5B and FIG. 5C are sectional views;

FIG. 7A is a perspective view, and FIG. 7B is a sectional view;

DESCRIPTION OF THE PREFERRED EMBODIMENTS

The embodiments of the invention will be described in detail with reference to the accompanying drawings.

Figure 1A:
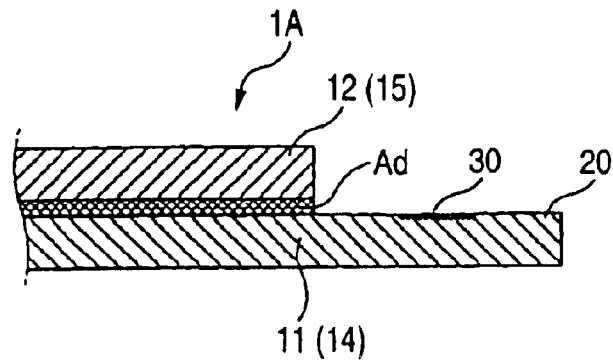
FIGS. 1A and 1B schematically show a construction of polarized electrodes for a laminated type electric double-layer condenser of a first embodiment according to the invention.
Figure 1B:
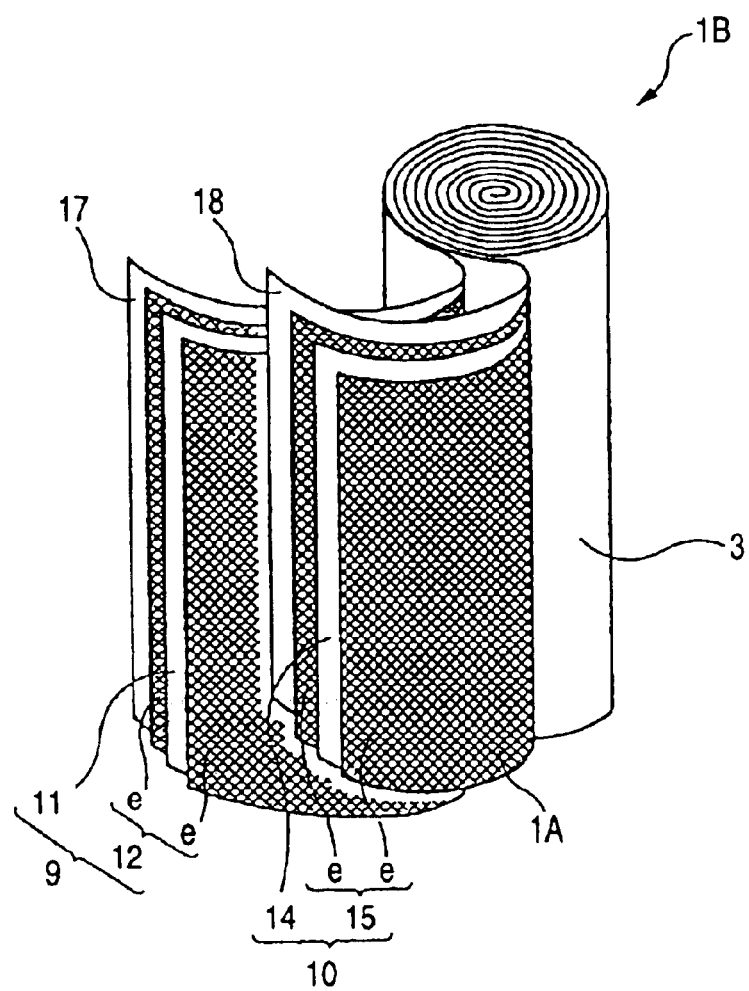
Figure 2A:
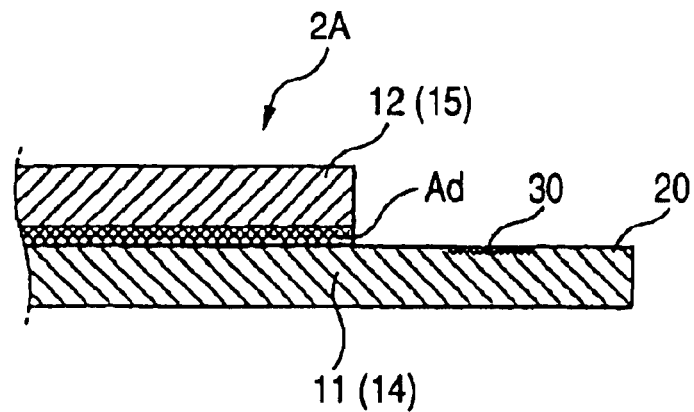
FIGS. 2A and 2B schematically show a construction of polarized electrodes for a laminated type electric double-layer condenser of a second embodiment according to the invention.
Figure 2B:
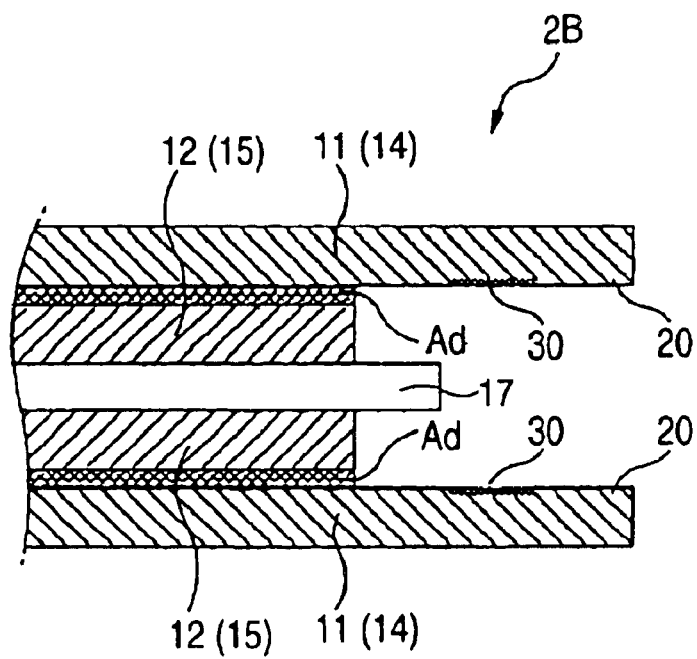
Figure 3A:
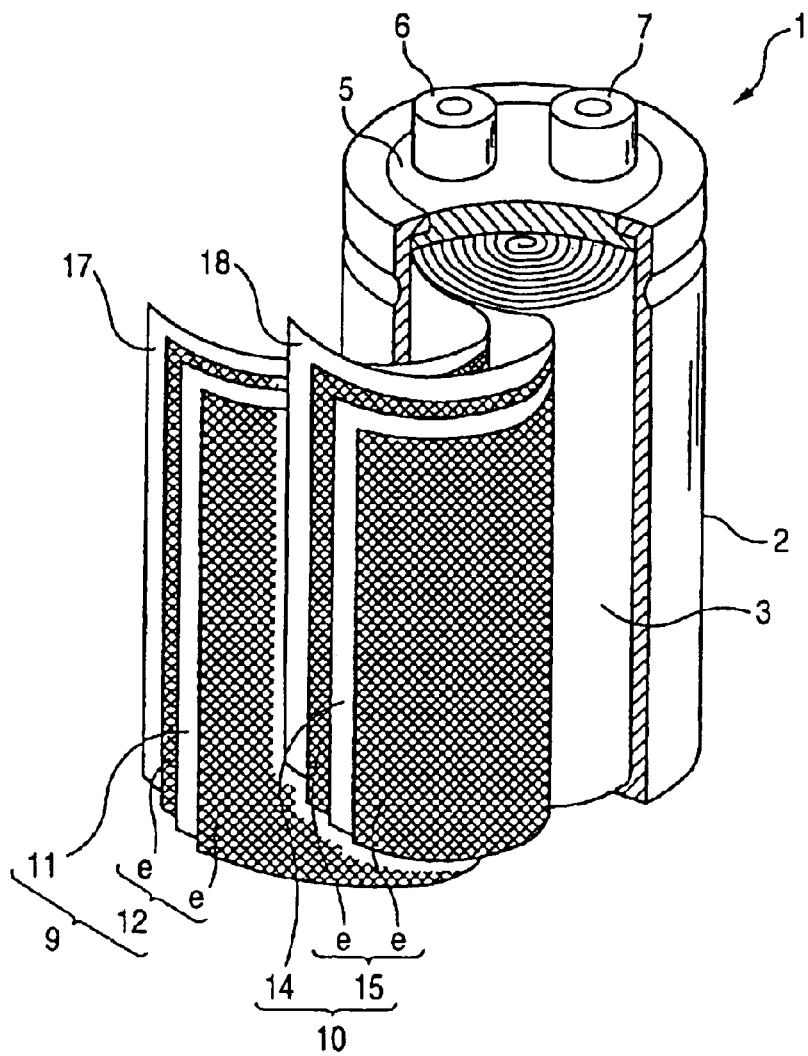
FIGS. 3A and 3B schematically show a construction of a third embodiment according to the invention.
Figure 3B:
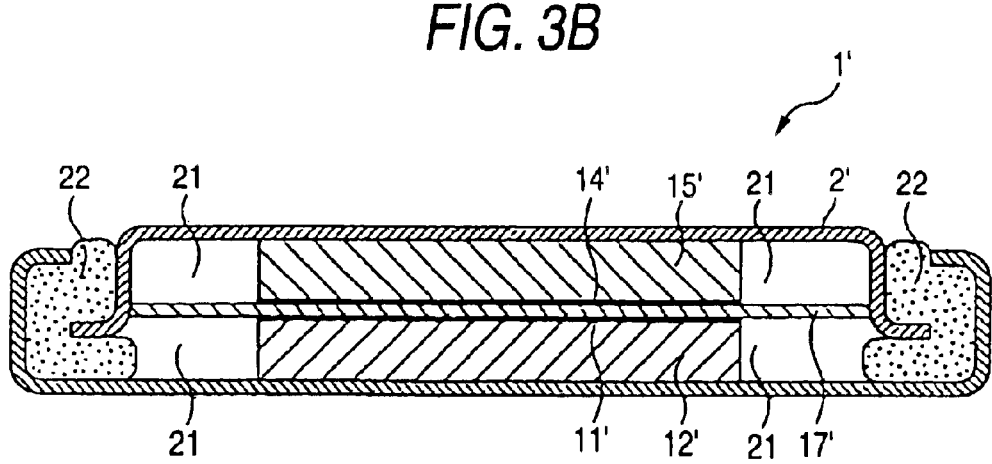

Of FIGS. 1A and 1B schematically showing a construction of polarized electrodes for an electric double-layer condenser (as will be called the "polarized electrodes") of a first embodiment according to the invention, FIG. 1A is a sectional view, and FIG. 1B is a perspective view of the polarized electrodes of a wound body, which is manufactured by winding those polarized electrodes in a spiral shape. Of FIGS. 2A and 2B schematically showing a construction of polarized electrodes of a second embodiment according to the invention, FIG. 2A is a sectional view, and FIG. 2B is a sectional view of a laminated body manufactured by laminating those polarized electrodes. FIGS. 3A and 3B are perspective views schematically showing a construction of a third embodiment according to the invention.

Here in the following description, the common constructional components will be omitted in their overlapped description by designating them by the identical reference numerals.

First Embodiment

The first embodiment according to the invention corresponds to Aspect 1 or Aspect 2. Specifically, in this first embodiment, as shown in the schematic section in FIG. 1A, an electrode member 1A is prepared by adhering an electrode 12 (15), which is formed into a sheet shape by dispersing an active substance including mainly active carbon and a conductive filler through a binder, to one side of a collecting foil 11 (14) having a conductivity. These electrode members 1A are spirally wound through a separator 17 into a laminated type polarized electrode 1B, as shown in FIG. 1B.

At this collecting foil 11 (14), there are formed an electrode non-forming portion 20 and a collecting portion 30 sequentially from the leading end side of the collecting foil 11 (14). The collecting portion 30 is a portion treated for collecting electricity effectively, and the electrode non-forming portion 20 is a portion not subjected to the aforementioned effectively electricity collecting treatment but exposed as it is to the outside.

Further, this polarized electrode 1B of the first embodiment is applied to a laminated type electric double-layer condenser 1. In the process for manufacturing this laminated type electric double-layer condenser 1, the polarized electrode 1B, as shown in FIG. 1B, is housed and packaged in a container 2. At this time, the electrode non-forming portion 20 is so housed in the container 2 that it is arranged at the axial end portion of the polarized electrode 1B. Even if the electrode non-forming portion 20 contacts with the side wall or the like of the container 2 so that it is subjected to a stress, the electrode non-forming portion 20 can absorb and relax the stress thereby to prevent the end portion of the electrode 12 (15) from being directly damaged. As a result, the separation of the end face of the electrode 12 (15) or the falling of the active substance from the electrode 12 (15) can be reduced to embody such a polarized electrode for an electric double-layer condenser as can produce a laminated type electric double-layer condenser having excellent self-discharging characteristics.

(Distance Between End Portion of Electrode and End Portion of Collecting Foil)

In the invention, it is necessary that the end portion of the electrode 12 (15) adhered to the collecting foil 11 (14) is spaced, at the two axial end portions of the laminated type polarized electrode 1B (FIG. 1A), at a distance of 0.1% or more with respect to the width of the electrode member 1A (or the collecting foil 11 (14)) from the end portion of the electrode member 1A (or the collecting foil 11 (14)). The reason for this necessity is described in the following. If the distance between the end portion of the electrode 12 (15) and the end portion of the electrode member 1A is less than 0.1%, the stress, when its acts on the end portion of the laminated type polarized electrode 1B, acts seriously on the end portion of the electrode 12 (15), too, to damage the end portion in a seriously high probability. As a result, the electric double-layer condenser, as manufactured by using this polarized electrode, is easily subjected to the separation of the end face of the electrode 12 (15) or the falling of the active substance from the electrode 12 (15). As a result, it is feasible to increase the self-discharge and to enlarge the dispersion of the self-discharge percentage between the products of the electric double-layer condenser.

In the invention, moreover, it is further preferred that the end portion of the electrode 12 (15) is arranged at a distance of 0.1% to 10% with respect to the width of the electrode member 15A from the end portion of the electrode member 1A. The reason for this necessity is described in the following. If the distance between the end portion of the electrode 12 (15) and the end portion of the electrode member 1A is less than 0.1%, the stress, when it acts on the end portion of the laminated type polarized electrode 1B, damages the end portion in a seriously high probability. If the distance between the end portion of the electrode 12 (15) and the end portion of the electrode member 1A is more than 10%, on the other hand, the capacity drop of the electric double-layer condenser, which is caused by the arrangement of the electrode 12 (15) at the predetermined distance from the end portion at the two axial end portions of the polarized electrode 1B, is seriously high.

(Collecting Foil)

The collecting foils 11 and 14 to be employed in the invention should not be limited on their material, but any substance having a conductivity of the prior art can be suitably selected, if necessary, so long as it takes secures the effect of the invention. An aluminum foil is suitable in the aspects of performance and cost, for example, for the collecting foils to be employed in the invention.

(Electrode Non-Forming Portion)

In the invention, the collecting foil 11 (14) can be provided at its end portion with the electrode non-forming portion 20, if necessary. This electrode non-forming portion 20 performs a role to relax a stress, if applied from the outside, thereby to prevent the damage of the electrode. Specifically in the process of manufacturing such electric double-layer condenser, the end portion of the electrode member 1A (or the collecting foil 11 (14)) is susceptible to the action of the stress from the outside so that the portion is relatively susceptible to the damage. The occurrence of such damage is a troublesome problem at the step of winding the band-shaped polarized electrode between the separators of the corresponding shape into the wound body and at the step of packaging the wound body.

In the invention, therefore, the electrode non-forming portion 20 having no electrode is formed at the end portion of the collecting foil 11 (14) or the portion thus being susceptible to the damage so that it can absorb and relax the stress when this stress is applied thereto from the outside. Thus, the stress can be suppressed in increase, even if applied from the outside to the end portion of the laminated type polarized electrode 1B, and can be prevented from influencing the electrode 12 (15). As a result, even if the damage occurs in the electrode non-forming portion 20, the electric characteristics of the electric double-layer condenser are not especially deteriorated because the electrode non-forming portion 20 has no direct participation into the electric function.

Here, the position to be provided with the electrode non-forming portion 20 is not especially limited, but can be suitably set according to the thickness, area or material of the collecting foil to be employed, if it is spaced at a distance of 0.1% or more with respect to the width of the electrode member 1A from the end portion of the electrode member 1A (or the collecting foil 11 (14)).

In order to suppress the capacity of the electric double-layer condenser within a smaller drop, it is further preferred that the electrode non-forming portion 20 is spaced, at the two axial end portions of the polarized electrode 1B, at a distance of 0.1% to 10% with respect to the width of the electrode member 1A from the end portion of the electrode member 1A (or the collecting foil 11 (14)). With this construction, the stress can be properly relaxed, even if applied to the end portion of the polarized electrode 1B, by the electrode non-forming portion 20 thereby to provide the effects to lower the probability to damage the end portion of the electrode 12 (15) and to lower the degree of the capacity drop of the electric double-layer condenser.

(Electrodes)

The electrode 12 (15) contained in the invention is formed into the band-shaped electrode member 1A, for example, by dispersing the active substance including mainly the not-shown active carbon and the conductive filler made of carbon black in the binder of a fluorine resin to form the sheet-shaped electrode 12 (15), as shown in the schematic section of FIG. 1A, and then by adhering the electrode 12 (15) to the collecting foil 11 (14) through the adhesive layer Ad. And, this band-shaped electrode member 1A is spirally wound between the separators 17 and 18 of the corresponding shape into the laminated type polarized electrode 1B, and this polarized electrode 1B is housed in a predetermined container (e.g., the container 2 of FIG. 3A) to form the electric double-layer condenser.

(Active Substance)

The active substance used in the invention largely contributes to the electric capacity of the polarized electrode for the electric double-layer condenser, and includes mainly active carbon having fine pores. The invention should not limit the kind of the active carbon to an especial one but can employ the active carbon of the prior art for the electric double-layer condenser suitably so long as the active carbon take effects of the invention.

The active carbon used in the invention can be exemplified by the active carbon used in the general carbon electrode of the prior art such as one prepared by treating an uncarbonized substance such as charcoal, coconut coal or brown coal with a gas such as water vapor or carbon dioxide or with a chemical such as zinc chloride. On the other hand, the active carbon can have various properties such as various powdery or granular shapes. Thus, the active carbon can have its specific surface area drastically increased by subjecting it to the various treatments of the prior art so that it can be made, if necessary, into the polarized electrode having a high electric capacity per unit volume.

(Adhesive)

The invention should not limit the kind of the adhesive layer Ad to an especial one but can make a selection from the adhesives of the prior art for use so long as the adhesives take effects of the invention. In the invention, the adhesive layer Ad is preferably constructed to contain an adhesive of a polyvinyl alcohol group.

(Etched Portion)

Here in the invention, an etched portion may be suitably formed at the portion, where the electrode 12 (15) is adhered with the collecting foil 11 (14), so as to enhance the adhesive properties between the collecting foil 11 (14) and the electrode 12 (15). The method or shape of forming the etched portion should not be especially limited, but an etched portion Et can be formed so long as it takes effects of the invention, by using the etched portion forming method known in the related art, such as various wet etching methods or dry etching methods of the prior art by forming a mask at portions other than the etched one. Moreover, a surface roughness can be suitably set according to the needs such as the adhesive properties.

(Separator)

Moreover, the invention should not limit the material of the separator especially but can apply the separator which is currently used in the relevant art field. The material of the separator to be employed can be exemplified by the mixed paper made of fibers of porous olefin resins (e.g., polyethylene or polypropylene), cellulose or polyester.

Here, the first embodiment according to the invention is thus far described on the electrode member 1A and the polarized electrode 1B for the electric double-layer condenser, which are constructed by forming the electrode 12 (15) only one side of the collecting foil 11 (14). In the invention, however, the electrode 12 (15) can be formed on the two sides of the collecting foil 11 (14) by a method similar to that of the polarized electrode 1B.

(Second Embodiment)

A polarized electrode of a second embodiment according to the invention corresponds to Aspect 3 or Aspect 4. Specifically, in this second embodiment, as shown in the schematic section in FIG. 2A, an electrode member 2A is prepared by adhering the electrode 12 (15) to one side of the collecting foil 11 (14) having a conductivity through the adhesive layer Ad. The electrode members 2A thus prepared are laminated through the separator 17, as shown in FIG. 2B, into a laminated type polarized electrode 2B.

This collecting foil 11 (14) is so treated at its one end portion as to collect the electricity effectively thereby to form the collective portion 30 but is not subjected at its other end portion to the effectively electricity collecting treatment thereby to form the electrode non-forming portion 20, where the collecting foil 11 (14) is exposed as it is to the outside.

Further, this polarized electrode 2B of the second embodiment is applied to a laminated type electric double-layer condenser 1', as shown in FIG. 3B. In the process for manufacturing this laminated type electric double-layer condenser 1', the polarized electrode 2B, as shown in FIG. 2B, is housed and packaged in a container 2'. At this time, the electrode non-forming portion 20 is so housed in the container 2' that it is arranged at the end portion of the polarized electrode 2B. Even if the electrode non-forming portion 20 contacts with the side wall or the like of the container 2' so that it is subjected to a stress, the electrode non-forming portion 20 can absorb and relax the stress thereby to prevent the end portion of the electrode 12 (15) from being directly damaged. As a result, the separation of the end face of the electrode member 2A or the falling of the active substance can be reduced to embody such a polarized electrode for an electric double-layer condenser as can produce a laminated type electric double-layer condenser having excellent voltage keeping characteristics.

The conditions necessary for the remaining elements contained in this second embodiment, such as the distance between the end portion of the electrode and the end portion of the collecting foil, the collecting foil 11 (14), the electrode non-forming portion 20, the electrode 12 (15), the active substance, the adhesive and the etched portion are identical to those of the first embodiment, so that their description will be omitted.

Here, the second embodiment according to the invention is thus far described on the polarized electrode 2B for the electric double-layer condenser, which is constructed by forming the electrode 12 (15) only one side of the collecting foil 11 (14). In the invention, however, the electrode 12 (15) can be formed on the two sides of the collecting foil 11 (14) by a method similar to that of the polarized electrode 2B.

(Third Embodiment)

A third embodiment corresponds to Aspect 5. Specifically, this third embodiment is embodied as either the laminated type electric double-layer condenser 1, as shown in FIG. 3A, which is manufactured by using the polarized electrode 1B for the laminated type electric double-layer condenser shown in FIG. 1A and FIG. 1B, or the laminated type electric double-layer condenser 1', as shown in FIG. 3B, which is manufactured by using the polarized electrode 2B for the coin type electric double-layer condenser shown in FIG. 2A and FIG. 2B.

The laminated type electric double-layer condenser 1 shown in FIG. 3A is constructed by housing a wound body 3, in which polarized electrodes 9 and 10 having electrodes 12(e) and 15(e) adhered to the collecting foils 11 and 14 are spirally wound through the separators 17 and 18, in the container 2, by filling the container 2 with the aforementioned electrolyte, and by sealing the housing 2 with a cover portion 5 having a positive terminal 6 and a negative terminal 7.

The coin type electric double-layer condenser 1' shown In FIG. 3B is constructed by housing a laminate, in which polarized electrodes having electrodes 12' and 15' adhered to the collecting foils 11' and 14' are laminated through a separator 17', in the container 2', and by filling the container 2' with the aforementioned electrolyte.

The laminated type electric double-layer condenser 1 or the coin type electric double-layer condenser 1' thus according to the third embodiment is suitable as a backup power source of an electronic device or a car-mounted battery.

EXAMPLES

The present invention will be specifically described by using examples according thereto.

(Method for Manufacturing Polarized Electrode for Electric Double-Layer Condenser)

A test piece of the polarized electrode for the electric double-layer condenser (as will be called the "polarized electrode") of the examples according to the invention is manufactured in the following manner. First of all, an active substance including active carbon is used, to which a conductive filler including acetylene black and a binder including polytetrafluoroethylene (PTFE) are added and agitated to prepare a mixture. This blending ratio (in mass ratio) is active carbon: acetylene black: PTFE=84:8:8. Moreover, isopropyl alcohol is added to that mixture and is kneaded under pressure for 8 minutes so that a fibrillation with PTFE is effected to produce the intimate mixture.

Next, this blend is pulverized to prepare powder of an average diameter of about 1 mm. Moreover, this powder is calendered to prepare a sheet. Subsequently, this sheet is rolled into a sheet-shaped electrode having a width of about 90 mm.

On the other hand, there is prepared the collecting foil made of aluminum foil having a width of about 100 mm (as will be called the "collecting aluminum foil"). The test piece of the examples of the polarized electrode according to the invention is prepared by adhering the aforementioned sheet to the portion which is spaced by 0.1 mm or the distance corresponding to 0.1% of the width (of 100 mm) of the collecting aluminum foil from the end portion of the sheet-shaped electrode.

Here, the product G-5780A of No Tape Kogyo Kabushiki Gaisha is used as the aforementioned adhesive.

Likewise, test pieces of the examples of various polarized electrodes satisfying the necessary conditions of the invention are prepared by adhering the sheet-shaped electrodes to the portions, which are spaced by 0.5 mm, 1 mm, 2 mm and 5 mm or the distances corresponding to 0.5, 1, 2 and 5% of the width (100 mm) of the collecting aluminum foil from the end portion of the electrode member. And, these test pieces of the examples are cut to a predetermined length and are wound together with the separators having shapes corresponding to those of the test pieces thereby to prepare the laminated type polarized electrodes. Subsequently, these polarized electrodes are subjected to the drying treatment thereby to manufacture the test pieces of the wound examples of the laminated type polarized electrodes.

(Method of Manufacturing Polarized Electrodes of Comparison)

As the comparison failing to satisfy the necessary conditions of the invention, on the other hand, the sheet-shaped electrode is prepared as in the examples according to the invention. Next, the adhesive is applied to the collecting aluminum foil, and the electrode is adhered to the collecting aluminum foil thereby to prepare the electrode member. Subsequently, this electrode member is used to prepare the laminated type polarized electrode. The sample thus obtained is used as the test piece of the comparison.

Here in this comparison, the electrode is adhered at the adhering step to the collecting aluminum foil with their end portions being registered. In the test piece of this comparison, more specifically, the distance between the end portion of the electrode and the end portion of the electrode member (i.e., the end portion of the collecting aluminum foil) is "0". Moreover, the adhesive used in this comparison is identical to that of the foregoing examples.

(Evaluation Method of Test Pieces)

The following evaluations are made on the examples thus manufactured and satisfying the necessary conditions of the invention and on the comparison thus manufactured but not satisfying the necessary conditions of the invention.

First of all, the test pieces of the examples of the aforementioned various kinds of laminated type polarized electrodes are used to manufacture evaluation cells (as will be called the "cells") of the electric double-layer condenser.

At first, the individual laminated type polarized electrodes of the examples and the comparison are housed in the containers of the cells, and a propylene carbonate solution of 4th-class ammonium salt (having a concentration of 1.8 mols/litter) is poured as the electrolyte into the containers.

In order that the individual laminated type polarized electrodes might be sufficiently impregnated with the electrolyte, those cells are then heated to 60° C. for an aging treatment so that they are defoamed. After this, the cells are charged to the output voltage of 2.5 V. Moreover, the cells thus charged are left to stand in the room for 312 hours. And, the voltage keeping percentages are calculated from the output voltage at this time.

For the yields of the cells thus made, there are manufactured one hundred cells, of which the cells having the voltage keeping percentage of 90% or higher are calculated as the accepted ones. The results are presented in FIG. 4 and Table 1.

Figure 4:
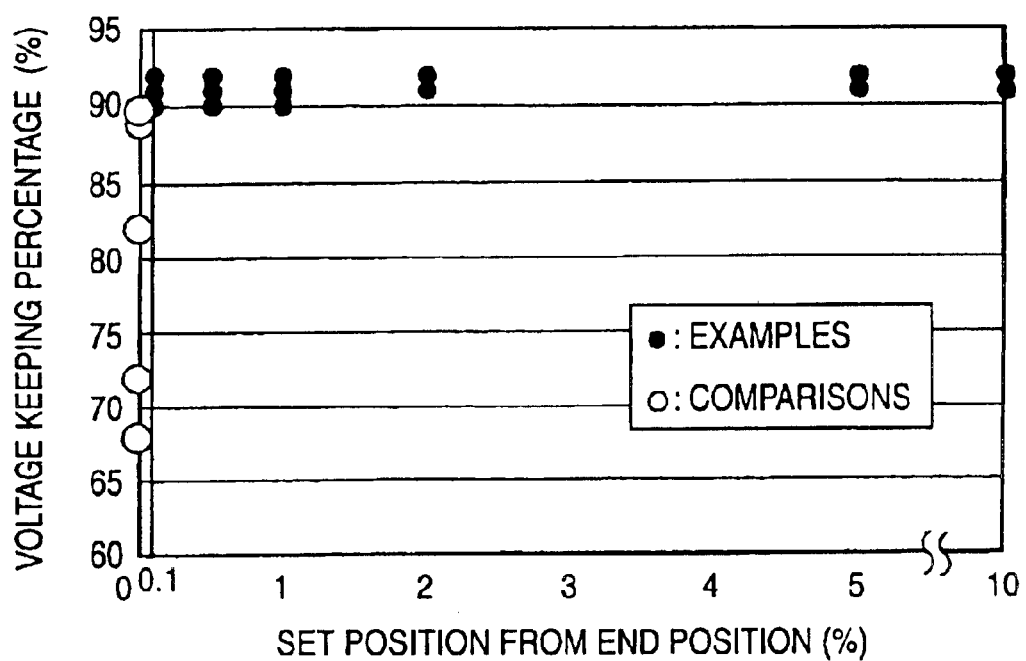
FIG. 4 is a graph plotting relations, of the individual samples of the embodiments according to the invention and comparisons not satisfying the necessary conditions of the invention, between: the distances (or set position %) of the ends portion of the electrodes and the end portions of collecting foils with respect to the width of collective aluminum foils; and the voltage keeping percentage of the testing cell of the electric double-layer condenser manufactured by using the aforementioned individual samples.

FIG. 4 show the relations, of the examples (as indicated by solid circles) according to the invention and the comparisons (as indicated by blank circles) not satisfying the necessary conditions of the invention, between the distances (i.e., the set position % from the end portion) between the end portion of the electrode member and the end portion of the collecting aluminum foil, and the voltage keeping percentage of the testing cells of the electric double-layer condenser manufactured by using the aforementioned individual samples. As shown in FIG. 4, all the samples of the examples according to the invention, that satisfy the condition specified in the invention, i.e., the condition that the end portion of the electrode member is spaced, at the two axial end portions of the wound member, at a distance of 0.1% or more with respect to the width of the electrode member from the end portion of the wound member, exhibited voltage keeping percentages as high as or higher than about 90%. However, it is found that the voltage keeping percentages of the samples of the comparisons not satisfying that condition disperse over a wide range of about 68 to 90%.

TABLE 1

| Section | Yield (%) |
| --- | --- |
| Example | 97 |
| Comparison | 75 |

Table 1 compares the yields of the examples and the comparison. As tabulated in Table 1, the yield of the examples satisfying the necessary conditions of the invention exhibited the high value of 97%. It is, however, found that the yield of the comparisons is at 75% lower than that of the example. It is, therefore, apparent that the polarized electrode for the electric double-layer condenser according to the invention is superior to the polarized electrode not satisfying the necessary conditions of the invention.

The examples of the invention are described in connection with the polarized electrode for the laminated type electric double-layer condenser. However, the invention should not be limited exclusively to those examples but can also be applied to the laminated type polarized electrode like that laminated type polarized electrode.

The following effects can be attained according to the invention thus far described.

According to Aspect 1 of the invention, more specifically, the polarized electrode for the laminated type electric double-layer condenser can be prevented from the direct damage even if a stress acts on the end portion thereof. As a result, the separation of the end face of the electrode member and the falling of the active substance can be reduced to provide a polarized electrode for the electric double-layer condenser, which can obtain the laminated type electric double-layer condenser having excellent voltage keeping characteristics.

According to the invention of Aspect 2, it is possible to provide the polarized electrode for the electric double-layer condenser, which can attain the aforementioned effects by suppressing such a capacity reduction of electric double-layer condenser as follows from the fact that the end portion of the electrode is arranged at the predetermined distance from the end portion at the two axial end portions of the laminated type polarized electrode.

According to the invention of Aspect 3, the polarized electrode for the laminated type electric double-layer condenser can be prevented from the direct damage even if a stress acts on the end portion thereof. As a result, the separation of the end face of the electrode member and the falling of the active substance can be reduced to provide a polarized electrode for the electric double-layer condenser, which can obtain the laminated type electric double-layer condenser having excellent voltage keeping characteristics.

According to the invention of Aspect 4, it is possible to provide the polarized electrode for the electric double-layer condenser, which can attain the aforementioned effects by suppressing such a capacity reduction of electric double-layer condenser as follows from the fact that the end portion of the electrode is arranged at the predetermined distance from the end portion at the two end portions of the laminated type polarized electrode.

According to the invention of Aspect 5, it is possible to provide the electric double-layer condenser, which is prevented from the problem that the manufacturing process is susceptible to the damage or separation of the polarized electrode, so that the yield can be improved to lower the cost and so that the desired performance can be exhibited stably for a long time.

Figure 5A:
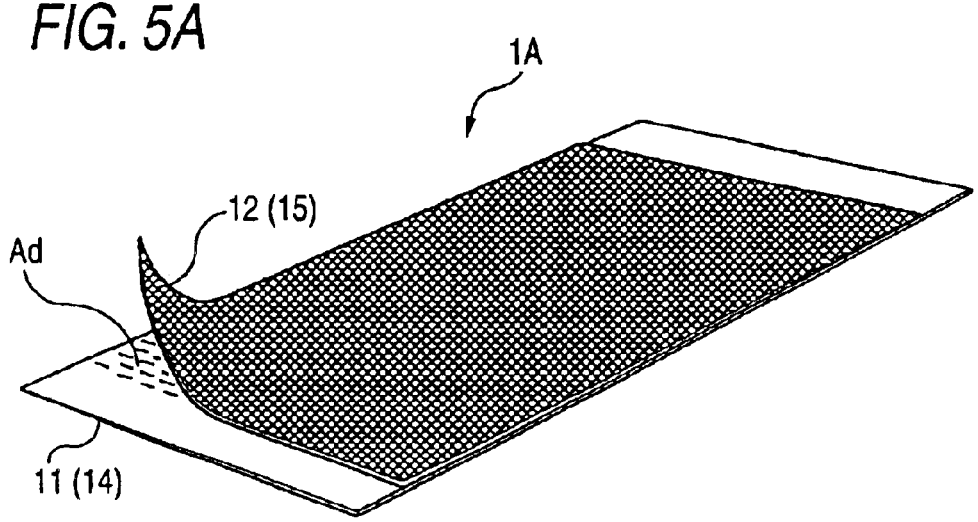
FIGS. 5A to 5C schematically show a construction of a polarized electrode for an electric double-layer condenser of a forth embodiment according to the invention.
Figure 5B:
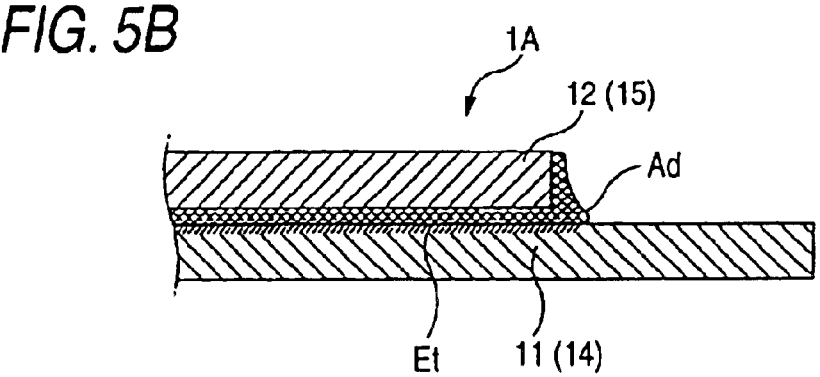
Figure 5C:
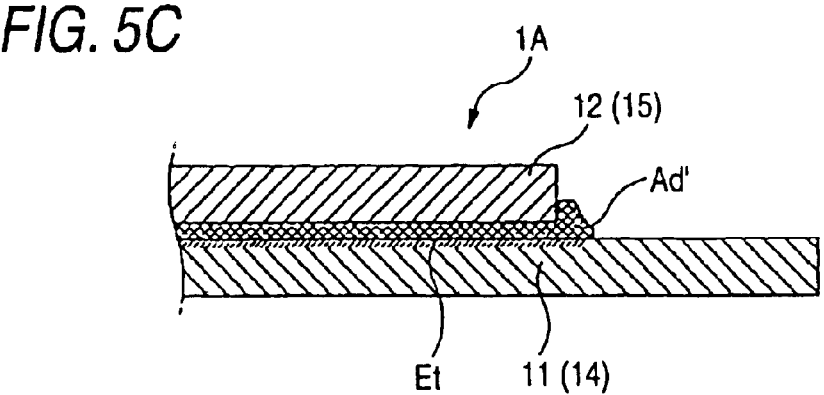
Figure 6:
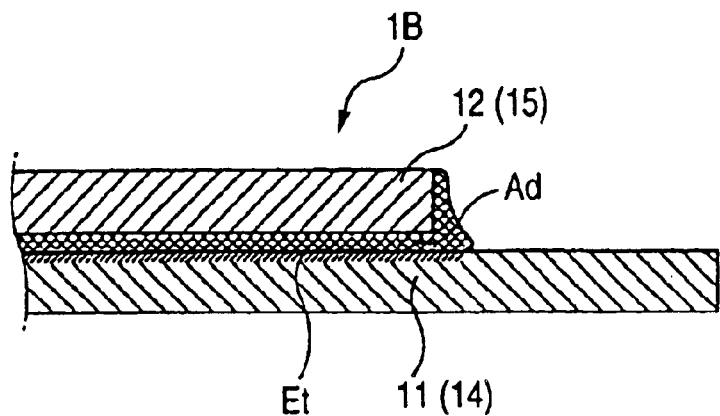
FIG. 6 is a sectional view schematically showing a construction of a polarized electrode for an electric double-layer condenser of a fifth embodiment according to the invention.
Figure 7A:
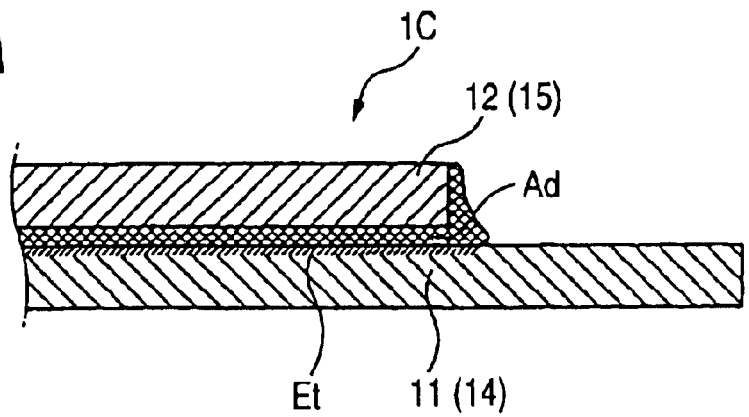
FIG. 7A and FIG. 7B schematically show a construction of a sixth embodiment according to the invention.
Figure 7B:
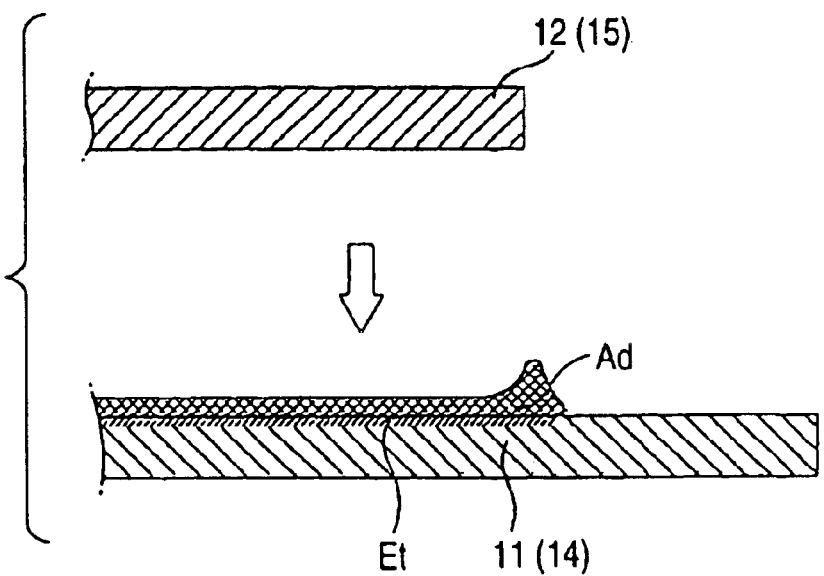
Figure 8:
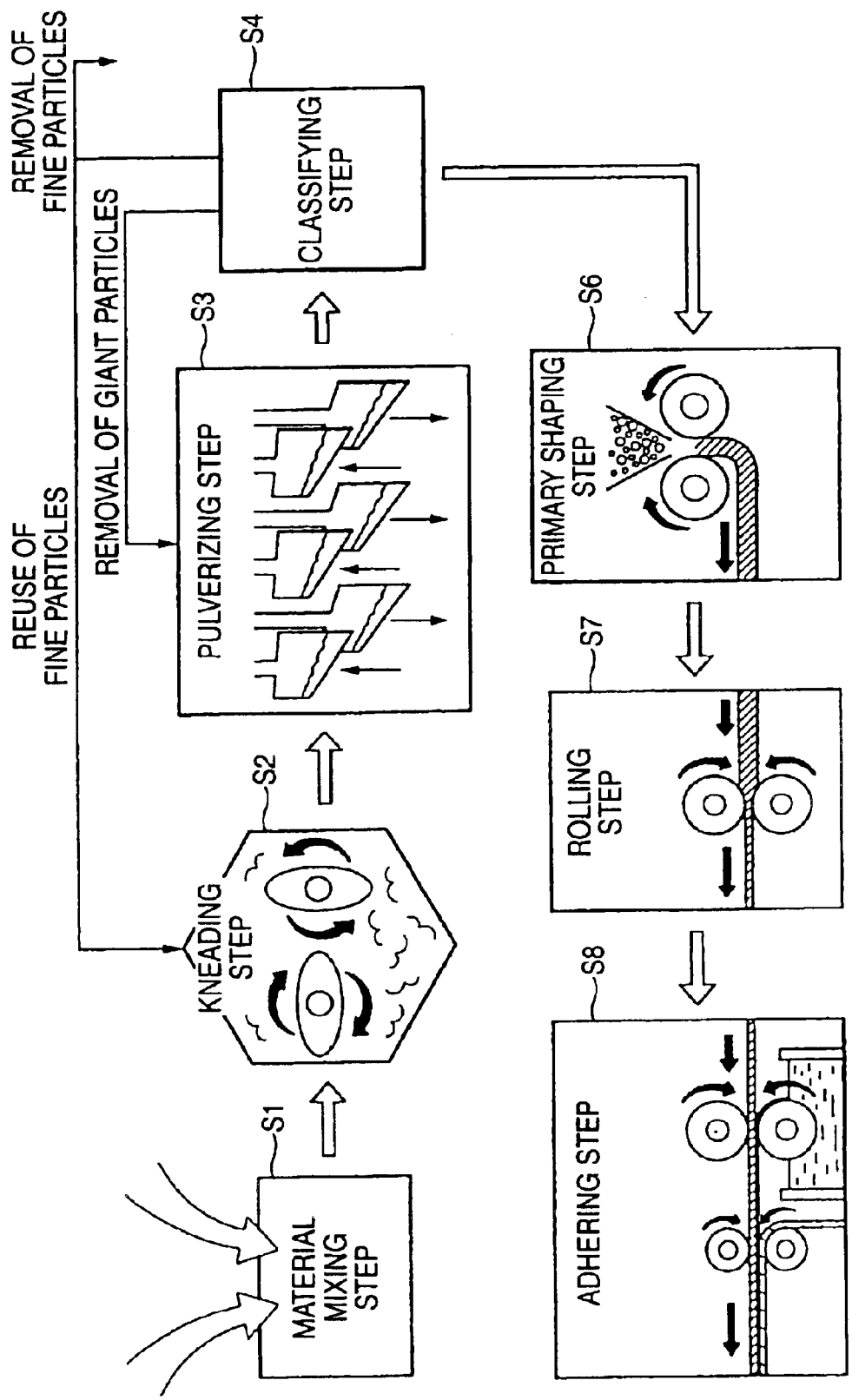
FIG. 8 is a diagram schematically showing a flow chart of a manufacturing process of a seventh embodiment according to the invention.
Figure 9:
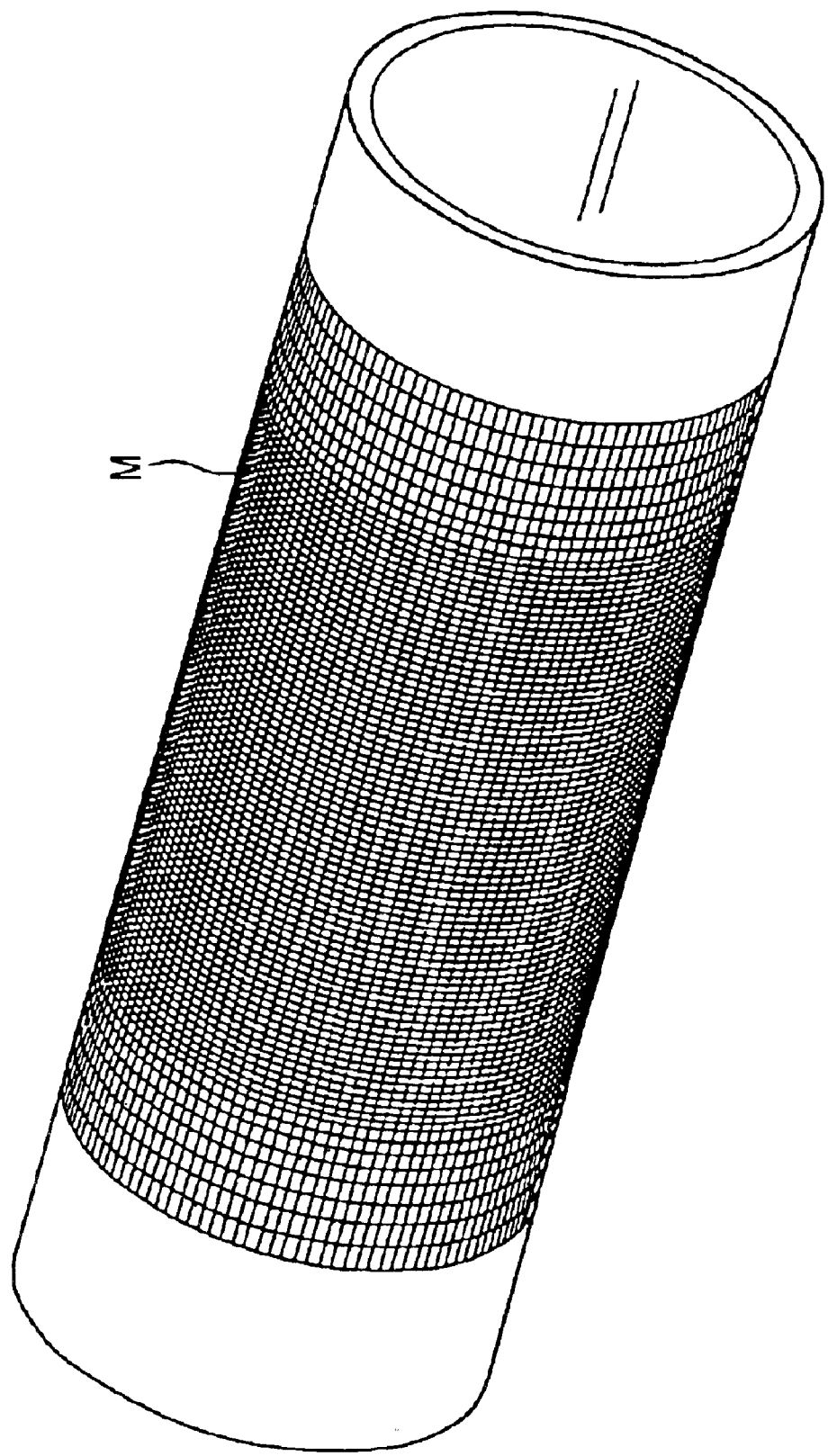
FIG. 9 is a diagram schematically showing a construction of a mesh roll to be used in an eighth embodiment according to the invention.
Figure 10:
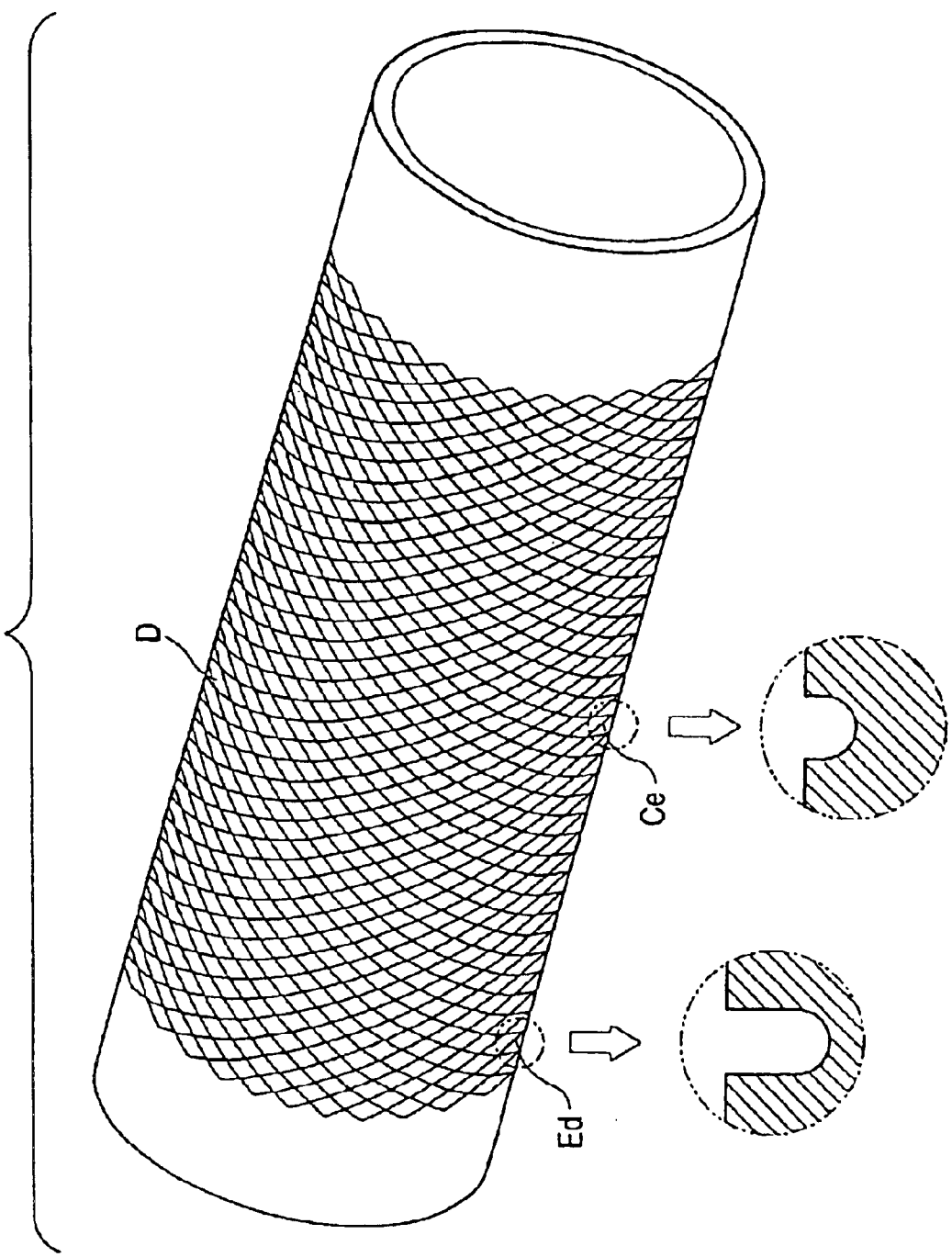
FIG. 10 is a diagram schematically showing a construction of a gravure roll to be used in a ninth embodiment according to the invention.

Of FIGS. 5A, 5B and 5C schematically showing a construction of a polarized electrode for an electric double-layer condenser (as will be called the "polarized electrode") of a forth embodiment according to the invention: FIG. 5A is a perspective view; and FIGS. 5B and 5C are sectional views. On the other hand, FIG. 6 is a sectional view schematically showing a construction of a polarized electrode of a fifth embodiment according to the invention, and FIGS. 7A and 7B are sectional views schematically showing a construction of a sixth embodiment according to the invention. Moreover: FIG. 8 is a diagram schematically showing a construction of a seventh embodiment according to the invention; FIG. 9 is a diagram schematically showing a construction of an eighth embodiment according to the invention; and FIG. 10 is a diagram schematically showing a construction of a ninth embodiment according to the invention.

Here in the following description, the common constructional components will be omitted in their overlapped description by designating them by the identical reference numerals.

(Forth Embodiment)

As shown in FIGS. 5A to 5C, the forth embodiment according to the invention is constructed as polarized electrode 1A by adhering an electrode 12 (15), which is formed into a sheet shape by dispersing an active substance including mainly active carbon and a conductive filler through a binder, to one face of a collecting foil 11 (14) having a conductivity through an adhesive layer Ad. This adhesive layer Ad is formed to have a width larger than that of the electrode 12 (15).

(Width of Adhesive Layer)

In this forth embodiment, the width of the adhesive layer Ad of the collecting foil is set larger by about 0.3% to 10% than that of the electrode 12 (15) to be adhered to the collecting foil 11 (14). The reason will be described in the following. If the width of the adhesive layer Ad is set to be 0.3% or less than that of the electrode 12 (15), there is not sufficiently obtained an effect to protect the two end portions of the electrode 12 (15) and their peripheries. If the width of the adhesive layer Ad is set to be 10% or more than that of the electrode 12 (15), the two end portions of the electrode 12 (15) are excessively coated to increase the adhesive layer unpreferably to an unnecessary extent.

In the invention, the collecting foil 11 (14) and the electrode 12 (15) are adhered through the adhesive layer Ad, which is set to have a width larger by about 0.3% to 10% than that of the electrode 12 (15). As shown in FIG. 5B, therefore, the adhesive layer Ad properly runs around the two end portions of the electrode 12 (15) and their peripheries thereby to protect the two end portion of the electrode 12 (15) and their peripheries sufficiently.

Here in the invention, the aforementioned protecting purpose is achieved even if the adhesive layer Ad has a shape shown in FIG. 5C. Specifically, it is not an essential condition for the invention that the adhesive layer Ad reaches the upper portion of the electrode 12 (15), but it is sufficient for the invention to have a structure, in which the lower portion of the electrode 12 (15) is coated with the adhesive layer Ad.

(Adhesive)

The invention should not limit the kind of the adhesive layer Ad to an especial one but can make a selection from the adhesives of the prior art for use so long as the adhesives take effects of the invention. In the invention, the adhesive layer Ad is preferably constructed to contain an adhesive of a polyvinyl alcohol group.

(Active Substance)

The active substance used in the invention largely contributes to the electric capacity of the polarized electrode for the electric double-layer condenser, and includes mainly active carbon having fine pores. The invention should not limit the kind of the active carbon to an especial one but can employ the active carbon of the prior art for the electric double-layer condenser suitably so long as the active carbon take effects of the invention.

The active carbon used in the invention can be exemplified by the active carbon used in the general carbon electrode of the prior art such as one prepared by treating an uncarbonized substance such as charcoal, coconut coal or brown coal with a gas such as water vapor or carbon dioxide or with a chemical such as zinc chloride. On the other hand, the active carbon can have various properties such as various powdery or granular shapes. Thus, the active carbon can have its specific surface area drastically increased by subjecting it to the various treatments of the prior art so that it can be made, if necessary, into the polarized electrode having a high electric capacity per unit volume.

(Collecting Foil)

The collecting foils 11 and 14 to be employed in the invention should not be limited on their material, but any substance having a conductivity of the prior art can be suitably selected, if necessary, so long as it takes secures the effect of the invention. An aluminum foil is suitable in the aspects of performance and cost, for example, for the collecting foils to be employed in the invention.

(Separator)

Moreover, the invention should not limit the material of the separator especially but can apply the separator which is currently used in the relevant art field. The material of the separator to be employed can be exemplified by the mixed paper made of fibers of porous olefin resins (e.g., polyethylene or polypropylene), cellulose or polyester.

Here, the forth embodiment according to the invention is directed to the polarized electrode 1A for the electric double-layer condenser, which is constructed by forming the electrode 12 (15) only one face of the collecting foil 11 (14). In the invention, however, the electrode 12 (15) can be formed on the two faces of the collecting foil 11 (14) by a manner similar to that of the polarized electrode 1A.

(Fifth Embodiment)

As shown in FIG. 6, the fifth embodiment according to the invention is constructed as a polarized electrode 1B by adhering the electrode 12 (15), which is formed into a sheet shape by dispersing an active substance including mainly active carbon and a conductive filler through a binder, to one face of the collecting foil 11 (14) having a conductivity through an adhesive layer Ad. This adhesive layer Ad is formed to have a width larger than that of the electrode 12 (15). At the same time, the collecting foil 11 (14) has an etched portion Et formed by an etching treatment at the portion, to which the electrode 12 (15) is adhered, and its vicinity, thereby to construct the polarized electrode 1B, in which the width of the etched portion Et is larger than the width of the electrode 12 (15) but smaller than that of the adhesive layer Ad. The construction of the second embodiment is identical to that of the forth embodiment excepting that the etched portion Et is added to the portion, to which the electrode 12 (15) is adhered, and its vicinity.

(Etched Portion)

In the invention, the etched portion Et can be formed at the portion to form the adhesive layer Ad so as to retain the adhesive properties between the electrode 12 (15) and the collecting foil 11 (14) sufficiently. When the electrode 12 (15) and the collecting foil 11 (14) are to be adhered through the adhesive layer Ad in accordance with the invention, moreover, the adhesive properties in between can be enhanced by the anchoring effect, which is caused by the proper roughness of the etched portion Et. As a result, the two end portions of the electrode 12 (15) and their peripheries become harder to separate. At this time, it is preferred that the width of the etched portion Et is formed to be larger than that of the electrode 12 (15) but smaller than that of the adhesive layer Ad. If the width of the etched portion Et is smaller than that of the electrode 12 (15), more specifically, a sufficient effect cannot be obtained for improving the adhesive properties between the electrode 12 (15) and the collecting foil 11 (14). In the width of the etched portion Et is smaller than that of the adhesive layer Ad, on the contrary, the electric characteristics of the polarized electrode 1B are unpreferably deteriorated although the adhesive properties between the electrode 12 (15) and the collecting foil 11 (14) are sufficiently retained.

In the invention, moreover, the method or shape of forming the etched portion Et should not be especially limited, but an etched portion Et can be formed so long as it takes effects of the invention, by using the etched portion forming method known in the related art, such as various wet etching methods or dry etching methods of the prior art by forming a mask at portions other than the etched one. Moreover, a surface roughness can be suitably set according to the needs such as the adhesive properties.

Here, the fifth embodiment according to the invention is thus far described on the polarized electrode 1B for the electric double-layer condenser, which is constructed by forming the electrode 12 (15) only one face of the collecting foil 11 (14). In the invention, however, the electrode 12 (15) can be formed on the two faces of the collecting foil 11 (14) by a method similar to that of the polarized electrode 1B.

(Sixth Embodiment)

As shown in FIG. 7A, the sixth embodiment according to the invention is constructed as a polarized electrode 1C by adhering the electrode 12 (15), which is formed into a sheet shape by dispersing an active substance including mainly active carbon and a conductive filler through a binder, to at least one face of the collecting foil 11 (14) having a conductivity through an adhesive layer Ad. This adhesive layer Ad is formed to have a width larger than that of the electrode 12 (15). At the same time, the collecting foil 11 (14) has an etched portion Et formed by an etching treatment at the portion, to which the electrode 12 (15) is adhered, and its vicinity, thereby to construct the polarized electrode 1C, in which the width of the etched portion Et is larger than the width of the electrode 12 (15) but smaller than that of the adhesive layer Ad and in which the adhesive layer Ad is formed thicker at its two ends and their peripheries than the remaining portions. The construction of the sixth embodiment is identical to that of the fifth embodiment excepting that the adhesive layer Ad is formed thicker at its two ends and their peripheries than the remaining portions.

In the sixth embodiment, more specifically, the adhesive layer Ad formed on the collecting foil 11 (14) is formed thicker at its two ends and their peripheries than the remaining portions, as shown in the schematic section of FIG. 7B showing the state of the adhesive layer Ad just before the electrode 12 (15) and the collecting foil 11 (14) are adhered through the adhesive layer Ad. When the electrode 12 (15) and the collecting foil 11 (14) are adhered in this state of the adhesive layer Ad, therefore, there is provided the polarized electrode for the electric double-layer condenser, in which the two end portions of the electrode 12 (15) and their peripheries are reliably protected, as shown in FIG. 7A.

(Seventh Embodiment)

The seventh embodiment according to the invention is directed to a process for manufacturing the polarized electrodes for the electric double-layer condenser of the first to third embodiments. FIG. 8 shows a flow chart showing the process of the seventh embodiment. As shown in FIG. 8, the process of the seventh embodiment is constructed to include: a material mixing step (Step S1) of mixing the material; a kneading step (Step S2) of preparing an intimate mixture by kneading the active carbon, the conductive filler and the binder; a pulverizing step (Step S3) of preparing granules by pulverizing the intimate mixture; a rolling step (Step S7) of preparing a sheet-shaped electrode by shaping the granules; and an adhering step (Step S8) having a step of applying an adhesive to an etched portion, at which the electrode is to be adhered to the collecting foil, and a step of manufacturing a polarized electrode for an electric double-layer condenser by adhering the electrode to at least one side of the collecting foil through the adhesive applied at the adhesive applying step.

Here in this seventh embodiment, a classifying step (Step S4) of classifying the granules into desired granularities, if necessary, after the pulverizing step (Step S3) of preparing the granules by pulverizing the intimate mixture. Thus, the polarized electrode according to the invention can be manufactured in a stabler quality. At this time, the cost for the material can be lowered, if the giant particle non-conforming to the specification, as produced at the classifying step (Step S4), is-recovered and returned to the pulverizing step (Step S3) If a primary shaping step (Step S6) of coarsely forming the granules classified to the desired granulation into a sheet shape is added after the classifying step (Step S4), moreover, the qualities in the thickness or smoothness can be more stabilized to manufacture the polarized sheet according to the invention.

Moreover, it is desired that the adhesive is so applied (as referred to FIGS. 7A and 7B) that the two end portions and their peripheries are thicker than the remaining portions at the adhesive applying step contained in this seventh embodiment, as is described in connection with the sixth embodiment.

(Eighth Embodiment)

The eighth embodiment according to the invention is directed to a process for manufacturing a polarized electrode for an electric double-layer condenser, in which the adhesive is so applied at the adhering step (Step S8) contained in the seventh embodiment to apply the adhesive by using a mesh roll shown in FIG. 9 that the two widthwise ends of the collecting foil and their peripheries may be thicker than the remaining portions. This eighth embodiment corresponds to the invention of Aspect 9.

(Mesh Roll)

The mesh roll to be used in the invention is constructed, as shown in FIG. 9, to include a mesh M, which is woven in a mesh shape of yarns of nylon, polyester or stainless steel on a roll face to apply the adhesive to the collecting foil contacting therewith. The amount of adhesive to be applied is adjusted by suitably adjusting the mesh size or the number of yarns woven within 2.54 cm (or 1 inch).

In case the amount of adhesive to be applied is increased, more specifically, it can be suitably adjusted by making the mesh size smaller (i.e., by reducing the number of yarns woven in 2.54 cm (1 inch) to make the texture coarser) as at the two end portions of the mesh roll shown in FIG. 9 and their peripheries. In case the amount of adhesive to be applied is decreased, on the other hand, it can be suitably adjusted by making the mesh size larger (i.e., by increasing the number of woven yarns to make the texture finer) as at the central portion excepting the two end portions of the mesh roll shown in FIG. 9 and their peripheries.

In the mesh roll to be employed in the invention, therefore, the two widthwise end portions of the mesh roll and their peripheral portions, as shown in FIG. 9, are made to have a smaller mesh size than that of the remaining portions. As the collecting foil 11 passes the mesh roll, therefore, the adhesive is applied such that the two widthwise ends of the collecting foil and their peripheries become thicker than the remaining portions (as referred to FIGS. 7A and 7B).

(Ninth Embodiment)

The ninth embodiment according to the invention is directed to a process for manufacturing the polarized electrode for an electric double-layer condenser, in which the adhesive applying step is so done by using a gravure roll shown in FIG. 10 to apply the adhesive that the two widthwise ends of the collecting foil and their peripheries are thicker than the remaining portions. This ninth embodiment corresponds to the invention of Aspect 10.

(Gravure Roll)

In a gravure roll to be used in the invention, as shown in FIG. 10, the roll face to be contacted by the collecting foil has adhesive-filled grooves D to be filled with adhesive, and these adhesive-filled grooves D are so formed that their grooves Ed at the two widthwise end portions of the roll face and their peripheries are deeper than the grooves Ce of the remaining portions. As the collecting foil passes this gravure roll, therefore, the adhesive is so applied that the two widthwise ends of the collecting foil and their peripheries are thicker than the remaining portions (as referred to FIG. 7.

(Tenth Embodiment)

A tenth embodiment corresponds to the invention of Aspect 11. Specifically, this tenth embodiment is embodied as either the laminated type electric double-layer condenser 1, as shown in FIG. 3A, or the coin type electric double-layer condenser 1', as shown in FIG. 3B.

The laminated type electric double-layer condenser 1 shown in FIG. 3A is constructed by housing a wound body 3, in which polarized electrodes 9 and 10 having electrodes 12(e) and 15(e) adhered to the collecting foils 11 and 14 are spirally wound through the separators 17 and 18, in the container 2, by filling the container 2 with the aforementioned electrolyte, and by sealing the housing 2 with a cover portion 5 having a positive terminal 6 and a negative terminal 7.

The coin type electric double-layer condenser 1' shown in FIG. 3B is constructed by housing a laminate, in which polarized electrodes having electrodes 12' and 15' adhered to the collecting foils 11' and 14' are laminated through a separator 17', in the container 2', and by filling the container 2' with the aforementioned electrolyte. In FIG. 3B, reference numeral 21 designates a portion to be filled with the electrolyte, and reference numeral 22 designates a packing provided for preventing the leakage of the electrolyte to the outside. The winding type electric double-layer condenser shown in FIG. 3A and the coin type electric double-layer condenser 1' shown in FIG. 3B are suitable for a backup power source of an electronic device or a car-mounted battery.

EXAMPLES

The present invention will be specifically described by contrasting examples according thereto with comparisons not satisfying the necessary conditions of the invention.
(Process for Manufacturing Polarized Electrode for Electric Double-Layer Condenser)

A test piece of the polarized electrode for the electric double-layer condenser (as will be called the "polarized electrode") of the examples according to the invention is manufactured in the following manner. First of all, an active substance including active carbon is used, to which a conductive filler including acetylene black and a binder including polytetrafluoroethylene (PTFE) are added and agitated to prepare a mixture. This blending ratio (in mass ratio) is active carbon:acetylene black:PTFE=84:8:8. Moreover, isopropyl alcohol is added to that mixture and is kneaded under pressure for 8 minutes so that a fibrillation with PTFE is effected to produce the intimate mixture.

Next, this blend is pulverized to prepare powder of an average diameter of about 0.5 mm. Moreover, this powder is calendered to prepare a sheet. Subsequently, this sheet is rolled into a sheet-shaped electrode having a width of about 90 mm.

On the other hand, there is prepared the collecting aluminum foil having a width of about 100 mm (as will be called the "collecting aluminum foil"). The polarized electrode for the electric double-layer condenser is prepared by applying the adhesive such that the width of the adhesive layer in the collecting aluminum foil is wider by 0.3% than that of the sheet-shaped electrode, and subsequently by adhering the sheet-shaped electrode to the collecting aluminum foil.

Here, the product G-5780A of No Tape Kogyo Kabushiki Gaisha is used as the aforementioned adhesive.

Like the above, the test pieces of the example of the polarized electrode for the electric double-layer condenser are manufactured by applying the adhesive to the collecting aluminum foil so that the width of the adhesive layer might be wider by 0.7, 1, 2, 4, 6 and 10% than that of the sheet-shaped electrode. And, these test pieces of the examples are cut to a predetermined length and are wound together with the separators having shapes corresponding to those of the test pieces thereby to prepare the wound member. These polarized electrodes are subjected to the drying treatment thereby to manufacture the test pieces of the examples of the laminated type polarized electrodes according to the invention.

Here, the adhesive applying step in the process for manufacturing a cell like the aforementioned one used a variety of mesh rolls. At this time, the mesh sizes of the aforementioned mesh roll are set to a line number of 150 (as will be expressed as "#150") per 2.54 cm (1 inch) and a depth of 35 microns at the portions corresponding to the two end portions of the sheet-shaped electrode and their peripheral portions, and to a line number of #180 and a depth of 25 microns at the remaining portions (e.g., the central portion of the sheet-shaped electrode), and the adhesive is so applied to form the adhesive layer that the adhesive layer at the positions corresponding to the two end portions of the sheet-shaped electrode might be thicker than those of the remaining portions. And, the test pieces of the polarized electrode for the electric double-layer condenser thus obtained are presented as the examples (i.e. the sample number: 20) according to the invention.
(Process for Manufacturing Polarized Electrodes of Comparisons)

As the comparisons failing to satisfying the conditions necessary for the invention, on the other hand, the sheet-shaped electrode is prepared as in the examples according to the invention. Next, the adhesive is applied to the collecting aluminum foil to prepare the polarized electrode for the electric double-layer condenser. Subsequently, this polarized electrode for the electric double-layer condenser is used to prepare the laminated type polarized electrode. Moreover, this polarized electrode is used to manufacture the cells of the comparisons.

Here, the cell, which is manufactured from the test piece of the polarized electrode having the application width of the adhesive equal to the width of the electrode at the step of applying the adhesive to the collecting aluminum foil, is comparison 2 (e.g., a sample number: 20), and the cell, which is manufactured from the test piece of the polarized electrode having the application width of the adhesive larger by 0.2% than the width of the electrode, is comparison 3 (e.g., a sample number: 20).
(Evaluation Method of Test Pieces)

The following evaluations are made on the examples thus manufactured and satisfying the necessary conditions of the invention and on the comparisons 2 and 3 thus manufactured but not satisfying the necessary conditions of the invention.

First of all, the test pieces of the examples of the laminated type polarized electrodes and the comparisons 2 and 3 are used to manufacture testing cells (as will be called the "cells") of the electric double-layer condenser. Specifically, the wound members of the polarized electrodes of the examples and the comparisons 2 and 3 are housed in the containers of the cells, and a propylene carbonate solution of 4th-class ammonium salt (having a concentration of 1.8 mols/litter) is poured as the electrolyte into the containers thereby to manufacture the cells.

In order that the wound members of the polarized electrodes might be sufficiently impregnated with the electrolyte, those cells are then heated to 60° C. for an aging treatment so that they are defoamed. After this, the cells are charged with a predetermined current to the output voltage of 2.5V. Moreover, the cells thus charged are left to stand in the room at 25° C. for 312 hours. And, the voltage keeping percentages are calculated from the output voltage at this time. For the yields of the cells thus made, there are continuously manufactured one hundred cells of the examples and the comparisons, of which the cells having the voltage keeping percentage of 90% or higher are calculated as the accepted ones. The results are presented in FIGS. 11 and 12 and Table 2.

Figure 11:
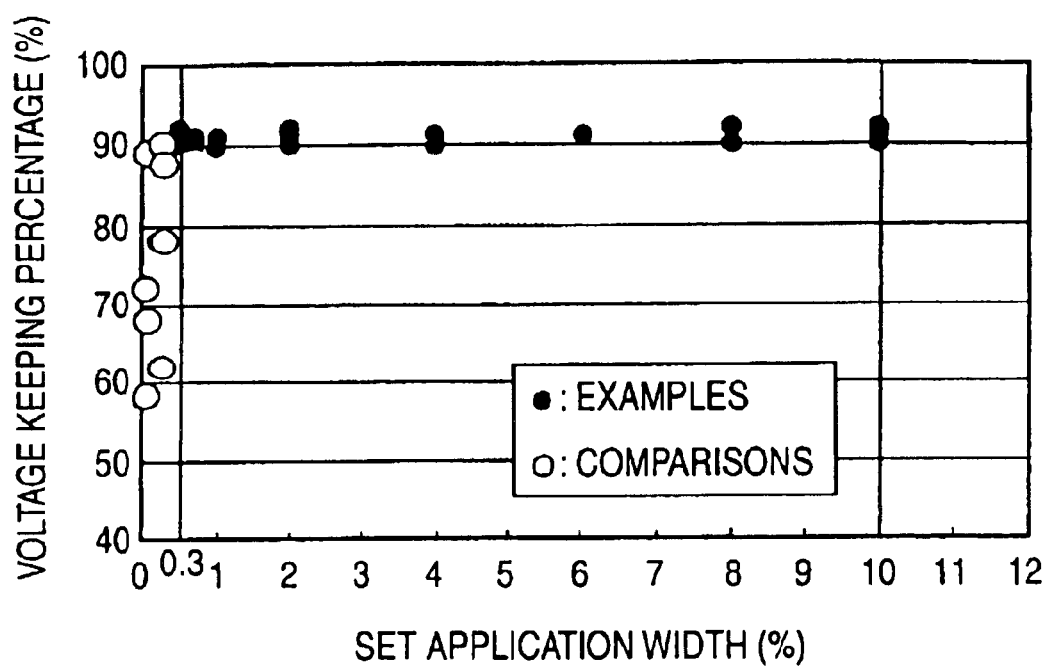
FIG. 11 is a graph plotting relations between the application width (or the set application width %) of the adhesive of the polarized electrode in the testing cells of the electric double-layer condenser and the voltage keeping percentage of the individual samples of the embodiments according to the invention and comparisons.

FIG. 11 show the relations, of the examples satisfying the necessary conditions of the invention and the comparisons (as indicated by blank circles) not satisfying the necessary conditions of the invention, between the application width (i.e., the set application width %) set for the collecting aluminum foil, and the voltage keeping percentage of the testing cells of the electric double-layer condenser manufactured by using the aforementioned individual samples. As shown in FIG. 11, all the samples (as indicated by solid circles) of the examples according to the invention, that satisfy the condition (that the application width of the adhesive layer formed on the collecting foil is set larger by 0.3 to 10% than that of the sheet-shaped electrode) of the application width of the adhesive layer specified in the invention, exhibited voltage keeping percentages stable at relatively high values of about 90 to 92%. However, it is found that the voltage keeping percentages of the samples (as indicated by blank circles) of the comparisons not satisfying that condition disperse over a wide range of about 58 to 89%.

Figure 12:
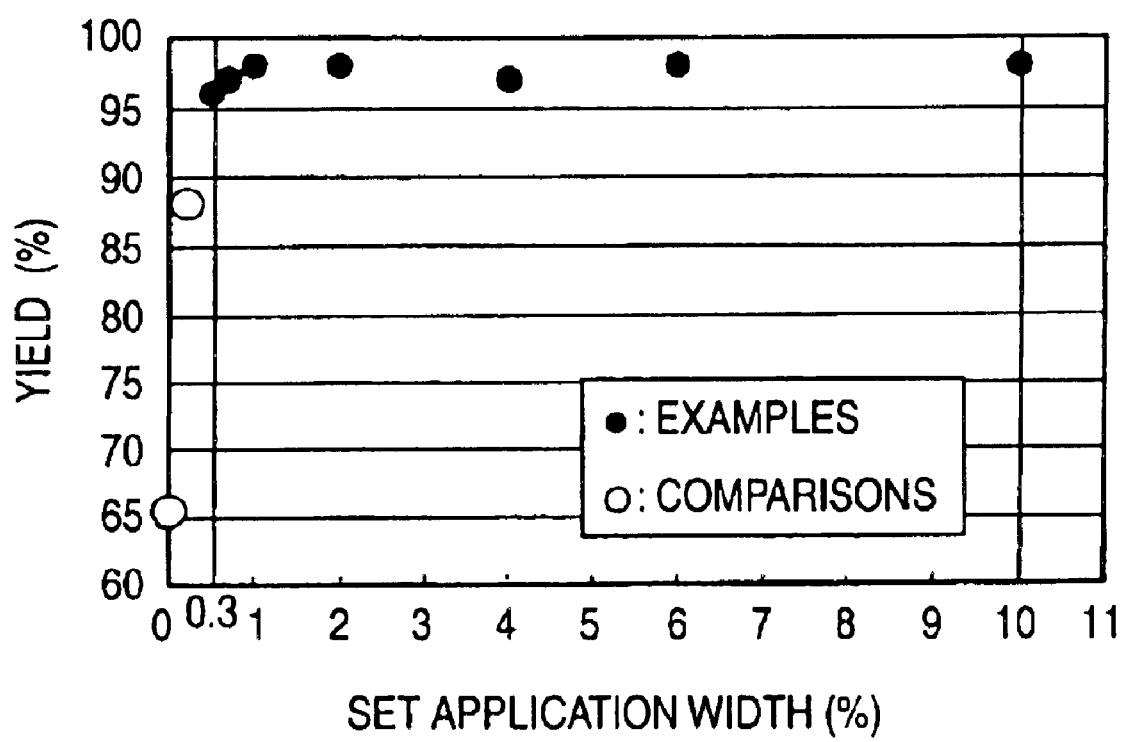
FIG. 12 is a graph plotting relations with the yields of the testing cells of the electric double-layer condenser of the individual samples of the embodiments according to the invention and the comparisons.

FIG. 12 show the relations, of the examples satisfying the necessary conditions of the invention and the comparisons (as indicated by blank circles) not satisfying the necessary conditions of the invention, between the application width set for the collecting aluminum foil, and the yield of the testing cells of the electric double-layer condenser manufactured by using the aforementioned individual samples. As shown in FIG. 12, all the samples (as indicated by solid circles) of the examples according to the invention, that satisfy the condition (that the application width of the adhesive layer formed on the collecting foil is set larger by 0.3 to 10% than that of the sheet-shaped electrode) of the application width of the adhesive layer specified in the invention, exhibited yields as high as or higher than about 96%. However, it is found that the yields of the samples (as indicated by blank circles) of the comparisons not satisfying that condition disperse over a wide range of about 65 to 88%.

TABLE 2

| Section | Voltage Keeping (%) | Yield (%) |
| --- | --- | --- |
| Example | 90 to 92 | 97 |
| Comparison 2 | 58 to 89 | 65 |

Table 2 compares the voltage keeping percentage and the yield of the example and the comparison 2. As tabulated in Table 2, the yield of the example satisfying the necessary conditions of the invention exhibited the voltage keeping percentage and the yield as high as 90 to 92% and 97%, respectively.

It is, however, found that the voltage keeping percentage and the yield of the comparison 2 is at 58 to 69% and 65%, respectively, lower than those of the example. It is, therefore, apparent that the polarized electrode for the electric double-layer condenser according to the invention is superior to the polarized electrode not satisfying the necessary conditions of the invention. Here, Table 2 shows only the comparison results between the example and the comparison 2, but similar results are obtained from the remaining examples and comparisons.

The following effects can be attained according to the invention thus far described.

According to Aspect 6 of the invention, more specifically, when the collecting foil and the electrode are adhered through the adhesive layer, the two end portions of the electrode are sufficiently protected by the adhesive layer so that the separation of the electrode end faces and the falling of the active substance are reduced. In addition to the effect to protect the end portions of the electrode by coating the two end portions of the electrode with the adhesive layer, moreover, the etched portion exhibits the anchoring effect with the adhesive layer so that the adhesive properties between the electrode and the collecting foil can be further enhanced to provide a polarized electrode for an electric double-layer condenser, in which the two end portions of the electrode and their peripheries are hardly separated from the collecting foil and which are excellent in the voltage keeping characteristics.

According to the invention of Aspect 7, when the electrode is to be adhered to the collecting foil through the adhesive layer, the adhesive layer can be spread relatively easily and properly from the clearance between the electrode and the collecting foil to the two end portions of the electrodes so that these two end portions can be coated and protected. As a result, the two end portions of the electrode and their peripheries can be protected more easily and reliably.

According to the invention of Aspect 8, it is possible to provide a manufacturing process for efficiently manufacturing the polarized electrode for the electric double-layer condenser, which can exhibit the aforementioned effects.

According to the invention of Aspect 9, the adhesive is applied to the collecting foil by using the mesh roll, which has a mesh size made larger in the two widthwise peripheries thereby to apply more adhesive to the peripheries of the two widthwise ends. Therefore, the thickness of the adhesive layer can be enlarged more easily at the two widthwise end portions of the collecting foil and their peripheries.

According to the invention of Aspect 10, the gravure roll for applying more adhesive to the two widthwise end peripheries by making the grooves deeper in the two widthwise end peripheries is used to apply adhesive to the collecting foil. The adhesive layer at the two widthwise end portions of the collecting foil and their peripheries can be easily made thicker.

According to the invention of Aspect 11, the two end portions of the electrode contained in the polarized electrode and their peripheries can be protected, and the adhesive properties between the electrode and the collecting foil can be further enhanced. It is, therefore, possible to provide an electric double-layer condense, which can maintain its shape while suppressing the cracking or breakage, even if used continuously for a long time in various modes and under various conditions, and which can satisfy the flexibility and cost adapted for the shaping works at the manufacturing time.

(Eleventh Embodiment)

Figure 13:
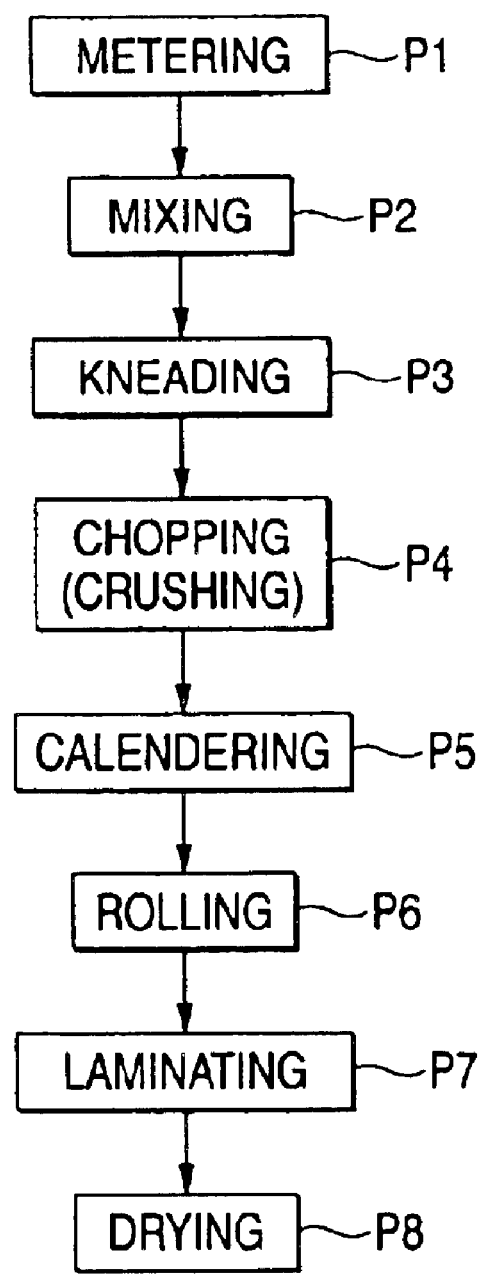
FIG. 13 is a diagram shows an embodiment of the invention and schematically the entirety of a process for manufacturing an electrode sheet.

An embodiment of the invention will be described with reference to the accompanying drawings. FIG. 13 schematically showing an entire process for manufacturing an electrode sheet for an electric double-layer condenser in this embodiment. Here in this embodiment, the entire process includes: the preparation of a long electrode sheet by adhering long sheet-shaped electrodes made mainly of active carbon to the two faces of a long aluminum foil for collecting electrodes, and the drying of the electrode sheet. This electrode sheet is used as a material for a cylindrical electric double-layer condenser of a high capacity, for example. Herein, a polarized electrode for a cylindrical type electric double-layer condenser will be called the "sheet-shaped electrode" and is discriminated from the electrode sheet, which is prepared by adhering the sheet-shaped electrodes to the aluminum foil for the conductive foil.

In order to manufacture the electrode sheet, there are sequentially executed individual steps of a metering step P1, a mixing step P2, a kneading step P3, a crushing step P4, a calendering step P5, a rolling step P6, a laminating step P7 and a drying step P8, as shown in FIG. 13. These individual steps will be schematically described in the sequential order.

At the first metering step P1, the material to be used for preparing the sheet-shaped electrode is metered. In this embodiment: active carbon is used as carbon powder; fine powder of carbon black is used as a conductive assistant; and powder of PTFE is used as a binder. The blending ratios of these materials in weight % are: 80% of active carbon; 10% of carbon black; and 10% of PTFE, for example. In this embodiment, moreover, IPA is used as a binder assistant.

At the mixing step P2, the active carbon and the carbon black of the above-specified materials are mixed. In this mixing, the active carbon and the carbon black metered are poured into the container of a mixer and turned for a predetermined time into the state, in which fine powder of carbon black is homogeneously dispersed between the active carbon particles. Moreover, the PTFE and the IPA are poured and are turned and mixed. As a result, the active carbon and the carbon black are further homogeneously mixed so that the fine powder of carbon black is homogeneously dispersed between the particles of active carbon and so that the PTFE is fibrillated to entangle the active carbon and the carbon black.

At the kneading step P3, the mixture having passed through the mixing step P2 is kneaded. This step is performed by containing the mixture in the container of the kneader and by turning blades while applying a pressure to the mixture with a cover. At this time, the container, cover and blades of the kneader are so controlled in temperature that they may be kept at 90° C., for example. Moreover, the kneader is controlled in hardness. As a result, the PTFE is further fibrillated to entangle the active carbon and the carbon black so that the intimate mixture takes a state of a lump of rubber.

At the crushing step P4, the intimate mixture kneaded at the aforementioned kneading step P3 is chopped into fine granules (or granulated powder). This step is performed by housing the intimate mixture in the container of a chopper and by turning chopping blades.

At the calendering step P5, the shaping material obtained from the aforementioned granulated powder is preliminarily shaped into a long sheet-shaped component. This step is performed by pouring a shaping material into the hopper of a calendering machine, shaping the material, as discharged from the exit of the hopper, into a continuous sheet shape with two calender rollers, and by taking up the sheet on the take-up roll. The sheet-shaped component obtained has a thickness size of 200 microns, for example.

At the rolling step P6, the sheet-shaped component is continuously rolled by a rolling apparatus to prepare a long sheet-shaped electrode having a predetermined thickness (e.g., 160 microns). This step is performed by rolling the sheet-shaped component between the two rollers while letting it off the let-off unit.

At this time, although not shown, the let-off unit is provided with a tension controller for controlling the tension of the sheet-shaped component being let off at a predetermined value, and the sheet-shaped component let off is fed, while being controlled in its widthwise position by an edge position roller, to the roll. At the take-up unit, moreover, the so-called "touch rolling" is done to take up the sheet-shaped electrode at a predetermined speed (or tension).

This rolling step is repeated by a plurality of (e.g., two or three) times to acquire a desired thickness size. At the final step, moreover, a secondary slitting step of cutting off the two end edge portions of the sheet-shaped electrode is also executed by pushing a cutting blade, although not shown, onto the drive roll on the take-up side. As a result, the sheet-shaped electrode is cut to a predetermined width to clear the two edge portions, which might otherwise take an unequal thickness and be cracked or broken.

At the next laminating step P7, moreover, the sheet-shaped electrodes 305 are adhered to an aluminum foil 302 for the conductive foil through a conductive adhesive 303 by using the laminating apparatus according to this embodiment, thereby to form an electrode sheet 308. In this case, the adhesion of the sheet-shaped electrodes 305 is performed twice for each of the two faces of the aluminum foil 302. This laminating step P7 and the laminating apparatus will be detailed in the following.

At the next drying step P8, the electrode sheet taken up in a roll shape is let off and dried through the drying chamber of a drier. At this time, the drying chamber is fed with a heating wind to clear the solvent contained in the conductive adhesive 303 and most of the IPA and moisture contained in the sheet-shaped electrode 305. Here, a vacuum drying could also be performed, if necessary.

Here, the laminating step P7 and the laminating apparatus will be described with reference to FIG. 14 to FIG. 16.

Figure 14:
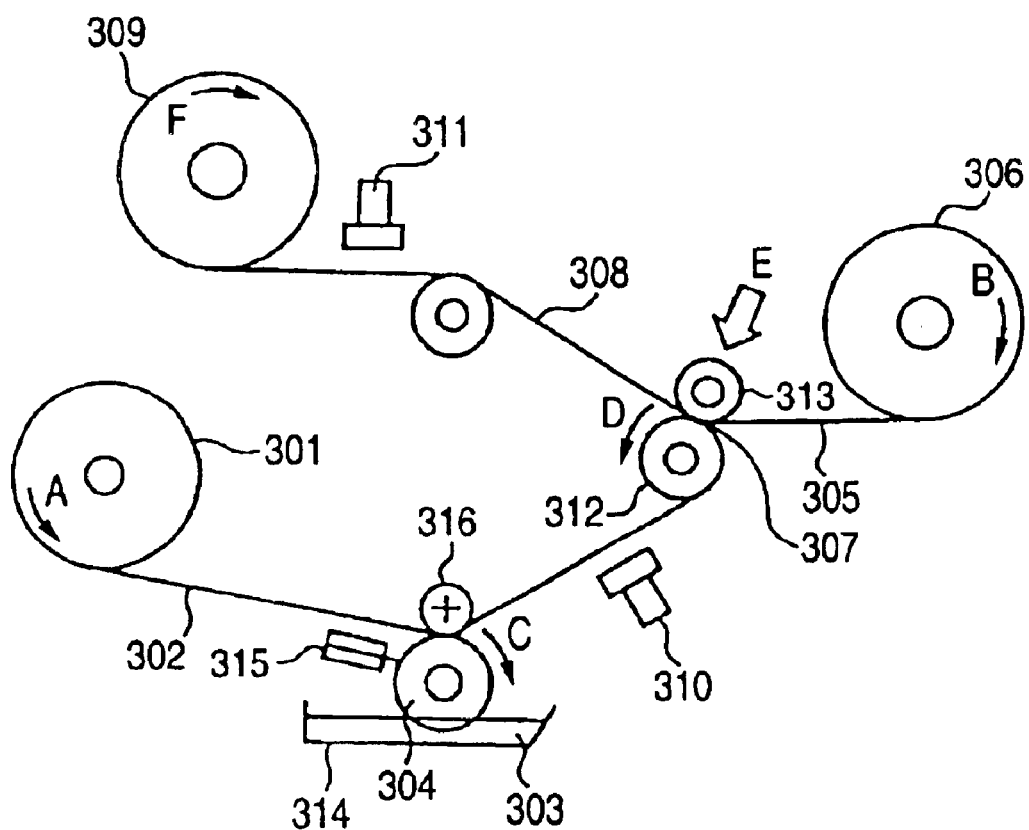
FIG. 14 is a front elevation schematically showing a construction of a laminating apparatus.

FIG. 14 shows a schematic construction of the laminating apparatus according to this embodiment. This laminating apparatus is constructed to include: an aluminum foil let-off unit 301 for letting off the aluminum foil 302; a gravure coater for applying the conductive adhesive 303 to the surface of the aluminum foil 302; a sheet-shaped electrode let-off unit 306 for letting off the sheet-shaped electrode 305; an adhering unit 307 for adhering the aluminum foil 302 and the sheet-shaped electrode 305; a take-up unit 309 for taking up the electrode sheet 308 adhered; an application state monitoring CCD camera 310 or an image pickup device including monitor section; and an adhesion position monitoring CCD camera 311 for monitoring the adhesion state of the sheet-shaped electrode 305 to the aluminum foil 302.

The aluminum foil let-off unit 301 is set with the long aluminum foil 302 wound turnably (in the direction of arrow A) in a roll shape. Moreover, the let-off unit 301 is provided, although not specifically shown, with a tension controller for adjusting the tension of the aluminum foil 302 being let off to a preset value, and an edge position controller for controlling the widthwise position of the aluminum foil 302 being let off thereby to prevent its meandering run.

At this time, the aluminum foil 302 is given a thickness size of 50 microns and a width size of 120 microns, for example, and is etched in advance on its surfaces (i.e., two faces) in this embodiment thereby to form etched faces 302a (as referred to FIG. 16) having a number of fine pores.

The aluminum foil 302 thus let off the aluminum foil let-off unit 301 comes to a later-described gravure coater, in which the conductive adhesive 303 is applied to its surfaces, and is then conveyed to the adhering unit 307. On the other hand, the sheet-shaped electrode let-off unit 306 sets the rolled long sheet-shaped electrode 305 turnably (in the direction of arrow B) and lets it off. The let-off unit 306 is provided with the (not-shown) tension controller for adjusting the tension of the sheet-shaped electrode 305 to be let off, and the edge position controller for controlling the widthwise position to prevent the meandering run.

The adhering unit 307 is constructed to include a drive roll 312 driven turnably at a predetermined speed in the direction of arrow D in FIG. 14, and a pressure roll 313 for applying a pushing force in the direction of arrow E. The aluminum foil 302 having the conductive adhesive 303 applied thereto and the sheet-shaped electrodes 305 let off the sheet-shaped electrode let-off unit 306 are guided in an overlapping state between the drive roll 312 and the pressure roll 313 so that they are adhered into the electrode sheet 308 as subjected to the compression force between the rolls.

Now, the gravure coater is constructed to include: an application roll (or a gravure roll) 304 for applying the conductive adhesive 303 to the aluminum foil 302; a (not-shown) drive mechanism for driving the application roll 304 turnably in the direction of arrow C; a pan 314 for reserving the conductive adhesive 303; a blade 315 for scraping off the excess of the conductive adhesive 303 held on the application roll 304; and a pinch roll 316 positioned above the application roll 304 for pinching the aluminum foil 302 between it and the application roll 304.

Figure 15:
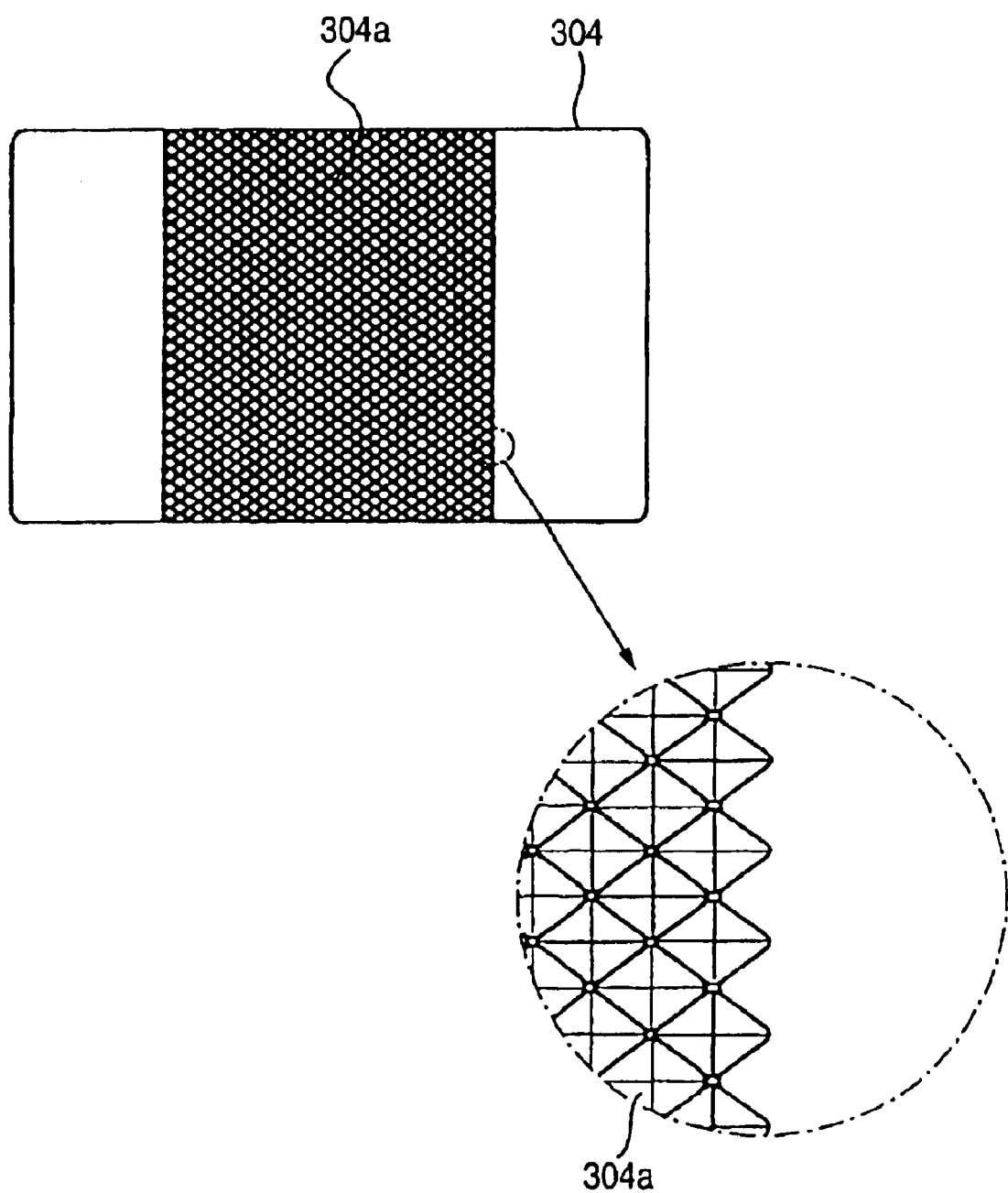
FIG. 15 is a diagram showing an exterior of an application roll.
Figure 16:
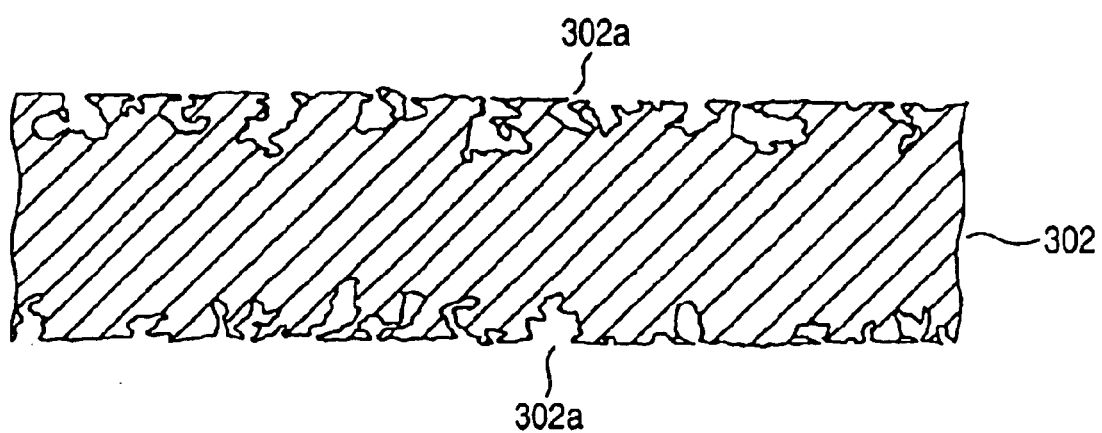
FIG. 16 is a sectional view of an etched face portion of an aluminum foil.
Figure 17:
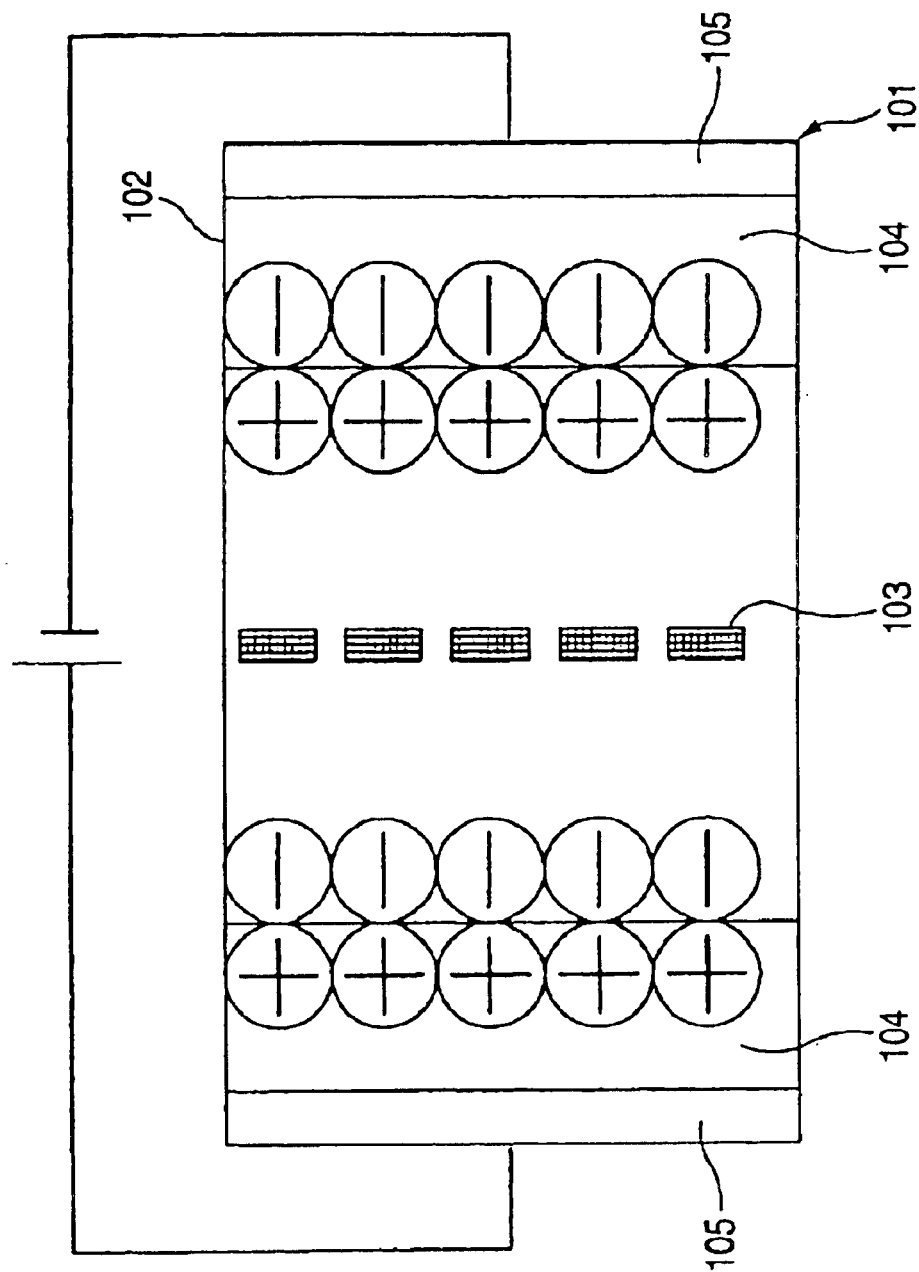
FIG. 17 is a sectional view schematically showing the construction of an electric double-layer condenser according to one example of the prior art.

Of these components, the application roll 304 is provided at a predetermined width area of its central portion, as shown in FIG. 15, with an engraved portion 304a, in which a number of recesses of a quadrangular prism are formed in a mesh shape. This application roll 304 is continuously turned at a predetermined speed in the direction of arrow C while having its lower end portion being immersed in the conductive adhesive in the pan 314. As a result, the conductive adhesive 303 is adhered at the portion, as pinched between the application roll 304 and the pinch roll 316, to the surface of the aluminum foil 303 while being kept at the engraved portion 304 to a predetermined amount per unit area. Thus, the application is performed. The application of this conductive adhesive 303 is made only on the etched faces 302a of the aluminum foil 302.

In this embodiment, moreover, just after the application of the conductive adhesive 303 (i.e., before arrival at the adhering unit 307), the state of the adhesive-applied faces of the aluminum foil 302 is continuously photographed and monitored by the application state monitoring CCD camera 310. Although not shown, the taken image data of the CCD camera 310 are inputted to an image processing device (or a monitor device) constructed mainly of a microcomputer, so that the application quality is judged. If the ratio of the area having the conductive adhesive 303 applied thereto is no more than a threshold value, an application failure is judged, and its position (how distant from the leading end of the aluminum foil 302, for example) or its time (which can specify the failure position by counting it back) is stored.

In this embodiment, moreover, just before the adhered electrode sheet 308 is taken up on the take-up unit 309, the state of the adhered end portions of the sheet-shaped electrodes 305 is continuously photographed and monitored by the adhesion position monitoring CCD camera 311. As a result, the propriety of the adhesion position of the sheet-shaped electrodes 305 with respect to the aluminum foil 302 is monitored, and the failure position is stored.

Now, at the laminating step P7 executed by using the laminating apparatus thus constructed, the conductive adhesive 303 is applied to the surfaces (or the etched faces 302a) of the aluminum foil 302 let off the aluminum foil let-off unit 301, by the gravure coater (or the application roll 304). Continuously from this application, the aluminum foil 303 is adhered at the adhering unit 307 to the sheet-shaped electrodes 305 let off the sheet-shaped electrode let-off unit 306, and is taken up by the take-up unit 309. As a result, it is possible to obtain the electrode sheet 308 for the long electric double-layer condenser.

At this time, the conductive adhesive 303 is applied with the application roll 304 having the engraved portion 304a by using the gravure coater, so that the conductive adhesive 303 can be applied evenly and sufficiently thinly to the surfaces of the aluminum foil 302. In this case, the conductive adhesive 303 can be homogeneously applied at a predetermined thickness (e.g., 2.5 microns in this embodiment) within a range of 10 microns or less. Moreover, the conductive fine particles in the conductive adhesive 303 migrate, when transferred, into the engraved portion 304 (or the recesses) of the application roll 304. As a result, the conductive fine particles are so applied to the surfaces of the aluminum foil 302 that they are distributed homogeneously without any deviation to provide excellent electric characteristics together with the thin thickness of the conductive adhesive 303.

At this time, moreover, the surfaces of the aluminum foil 302 are etched in advance to form the etched faces 302a, so that the so-called "anchoring effect" of the adhesive 303 can be attained to enhance the adhesion strength between the aluminum foil 302 and the sheet-shaped electrodes 305 to a higher level. At the same time, the conductive fine particles (i.e., the fine particles of the carbon black) in the conductive adhesive 303 can migrate into the pores of the etched faces 302a thereby to enhance the electric characteristics to a higher level (or to lower the contact resistance).

Here at the gravure coater portion, the conductive adhesive 303 is continuously applied extremely thinly to the long aluminum foil 302, and may possibly be partially cut (to fail in the application). The adhesion to the sheet-shaped electrodes 305 is continuously done so that the application failure position of the adhesive 303 becomes difficult to specify. Even if the sheet-shaped electrodes 305 adhered to the aluminum foil 302 may be offset in the widthwise direction, moreover, the electrode sheet 308 is continuously taken up so that its position later becomes difficult to specify.

Here in this embodiment, the state of the adhesive-applied faces of the aluminum foil 302 is continuously monitored by the application state monitoring CCD camera 310. Even if the adhesive 303 is partially cut, its application failure position is stored so that it can be properly treated after the application. Moreover, the state of the adhered end portions of the sheet-shaped electrodes 305 is continuously monitored by the application position monitoring CCD camera 311. Therefore, a failure in the adhesion position, if any, can be treated after the application.

Thus according to this embodiment, the sheet-shaped electrodes 305 and the aluminum foil 302 are adhered through the conductive adhesive 303 to manufacture the long electrode sheet 308 for the electric double-layer condenser. Thus, it is possible to attain the excellent effects that the contact resistance between the sheet-shaped electrodes 305 and the aluminum foil 302 can be sufficiently reduced, and that a sufficient joint strength can be retained. Moreover, the laminating apparatus of this embodiment is suitable for executing the aforementioned manufacturing process.

Here in the foregoing embodiment, there are provided both the application state monitoring CCD camera 310 and the adhesion position monitoring CCD camera 311. However, their monitors may be done, if necessary, and only one camera may be provided. The image pickup device should not be limited to the CCD camera. Moreover, the laminating apparatus can also be constructed to adhere the sheet-shaped electrodes once to the two faces of the aluminum foil both at once.

In addition, a variety of metal foils can be adopted as the conductive film not limiting to the aluminum foil. For the material to shape the sheet-shaped electrodes, moreover, various kinds of materials can be combined and blended, and the sizes of the individual portions are presented just for exemplification. In the aforementioned embodiment, still moreover, the individual steps are presented just for one example and can be omitted or modified, so that they can be suitably changed within the scope not departing from the gist of the invention.

What is claimed is:

1. A polarized electrode for a laminated type electric double-layer condenser, comprising:

a band-shaped electrode member including an electrode: prepared by dispersing an active substance including mainly active carbon and a conductive filler through a binder and by forming them into a sheet shape; and adhered to at least one face of a collecting foil having a conductivity, and a separator having a shape corresponding to that of the electrode member are alternately laminated and spirally wound up, wherein the end portion of the electrode is spaced, at the two axial end portions of the laminated type polarized electrode, at a distance of 0.1% or more of the width of the electrode member from the end portion of the electrode member.

2. The polarized electrode for a laminated-type electric double-layer condenser according to claim 1, wherein the end portion of the electrode is spaced, at the two axial end portions of the laminated type polarized electrode, at a distance of 0.1% to 10% of the width of the electrode member from the end portion of the electrode member.

3. A polarized electrode for a laminated type electric double-layer condenser, comprising:

a band-shaped electrode member including an electrode: prepared by dispersing an active substance including mainly active carbon and a conductive filler through a binder and by forming them into a sheet shape; adhered to at least one face of a collecting foil having a conductivity; and cut to a desired size, and a separator having a shape corresponding to that of the electrode member are alternately laminated into a laminate, wherein the end portion of the electrode is spaced, at the two axial end portions of the laminated type polarized electrode, at a distance of 0.1% or more of the width of the electrode member from the end portion of the electrode member.

4. The polarized electrode for a laminated type electric double-layer condenser according to claim 3, wherein the end portion of the electrode is spaced, at the two end portions of the laminated type polarized electrode, at a distance of 0.1% to 10% of the width of the electrode member from the end portion of the electrode member.

5. The electric double-layer condenser comprising a polarized electrode for an electric double-layer condenser according to any of claim 1 to claim 4.

6. A polarized electrode for an electric double-layer condenser, comprising:

a collecting foil having a conductivity, and an electrode prepared by dispersing an active substance including mainly active carbon and a conductive filler through a binder and by forming them into a sheet shape is adhered through an adhesive layer to at least one face of the collecting foil, wherein the collecting foil has an etched portion subjected to an etching treatment, at the portion, to which the electrode is adhered, and in a vicinity thereof, wherein the etched portion is formed to have a width larger than that of the electrode and smaller than that of the adhesive layer, and wherein the adhesive layer has a width set larger by about 0.3 to 10% than that of the electrode member.

7. The polarized electrode for an electric double-layer condenser according to claim 6, wherein the adhesive layer is formed thicker at two ends and the peripheries thereof than at the remaining portions.

8. The process for manufacturing an polarized electrode for an electric double-layer condenser according to claim 6, comprising the steps of:

preparing an intimate mixture by kneading an active substance including mainly active carbon, a conductive filler and a binder;

preparing granules by pulverizing the intimate mixture;

preparing a sheet-shaped electrode by shaping the granules;

applying an adhesive to the etched portion, to which the electrode is to be adhered, of the collecting foil; and manufacturing a polarized electrode by adhering the electrode to at least one face of the collecting foil through the adhesive applied at the adhesive applying step, wherein the adhesive applying step applies the adhesive so that the two ends and peripheries thereof may be thicker than the remaining portions.

9. The process for manufacturing a polarized electrode for an electric double-layer condenser, according to claim 8, wherein the adhesive applying step is done by using a mesh roll on the applying face of a roll, wherein the mesh roll is formed such that the mesh size of the two widthwise ends and peripheries thereof is larger than that of the remaining portions, and wherein as the collecting foil passes the mesh roll, the adhesive is so applied that the adhesive layer at the two widthwise ends of the etched portion of the collecting foil and the peripheries thereof is thicker than at the remaining portions.

10. The process for manufacturing a polarized electrode for an electric double-layer condenser, according to claim 8, wherein the adhesive applying step is done by using a gravure roll, wherein the gravure roll is so formed that the gravure roll has adhesive-filled grooves to be filled with the adhesive in the roll face to be contacted by the collecting foil, and that the adhesive-filled grooves are deeper at the two widthwise ends of the roll face and the peripheries thereof than at the remaining portions, and wherein as the collecting foil passes the gravure roll, the adhesive is so applied that the adhesive layer at the two widthwise ends of the etched portion of the collecting foil and the peripheries thereof is thicker than at the remaining portions.

11. The electric double-layer condenser manufactured by using a polarized electrode for an electric double-layer condenser according to claim 6.

12. A process for manufacturing an electrode sheet for an electric double-layer condenser, comprising:

a laminating step of manufacturing long sheet-shaped electrodes having a-predetermined thickness of a shaping material containing carbon powder, a conductive assistant and a binder, and then adhering the sheet-shaped electrodes to the surfaces of a long conductive foil through a conductive adhesive, wherein the laminating step is performed by adhering the sheet-shaped electrodes while applying the conductive adhesive with a thickness of 10 microns or less to the surfaces of the conductive foil by using a gravure coater.

13. The process for manufacturing an electrode sheet for an electric double-layer condenser according to claim 12, wherein at the laminating step, the surface state of the conductive foil having the conductive adhesive applied thereto is continuously monitored by an image pickup device.

14. A laminating apparatus for manufacturing an electrode sheet for an electric double-layer condenser by adhering sheet-shaped electrodes, as formed of a shaping material containing carbon powder, a conductive assistant and a binder into a long sheet shape of a predetermined thickness, to the surfaces of a long conductive foil through a conductive adhesive, comprising:

a gravure coater, and adhesive applying section for applying the conductive adhesive with a thickness of 10 microns or less to the surfaces of the conductive foil by using the gravure coater.

15. The laminating apparatus according to claim 14, further comprising:

monitor section for continuously monitoring the surface state of the conductive foil having the conductive adhesive applied thereto, by an image pickup device.

* * * * *